US010744620B2

United States Patent
Nambiath et al.

(10) Patent No.: US 10,744,620 B2
(45) Date of Patent: Aug. 18, 2020

(54) AIR FLOW MANAGEMENT SYSTEMS AND METHODS TO FACILITATE THE DELIVERY OF ABRASIVES TO AN ABRASIVE FLUID JET CUTTING HEAD

(71) Applicant: Shape Technologies Group, Inc., Kent, WA (US)

(72) Inventors: Pradeep Nambiath, Rogers, AR (US); Mohamed A. Hashish, Bellevue, WA (US); Alex M. Chillman, Seattle, WA (US); Steven J. Craigen, Auburn, WA (US)

(73) Assignee: Shape Technologies Group, Inc., Kent, WA (US)

( * ) Notice: Subject to any disclaimer, the term of this patent is extended or adjusted under 35 U.S.C. 154(b) by 106 days.

(21) Appl. No.: 15/711,935

(22) Filed: Sep. 21, 2017

(65) Prior Publication Data
US 2019/0084125 A1 Mar. 21, 2019

(51) Int. Cl.
*B24C 7/00* (2006.01)
*B24C 1/04* (2006.01)
(Continued)

(52) U.S. Cl.
CPC ............ *B24C 7/0076* (2013.01); *B24C 1/045* (2013.01); *B24C 7/0053* (2013.01); *B24C 5/04* (2013.01);
(Continued)

(58) Field of Classification Search
CPC ..... B24C 7/0076; B24C 7/0053; B24C 1/045; B24C 5/04
(Continued)

(56) References Cited

U.S. PATENT DOCUMENTS 3,053,016 A  9/1962 Johnston et al.
3,769,753 A * 11/1973 Fleischer .................. B24C 3/12
451/102

(Continued)

FOREIGN PATENT DOCUMENTS

GB  2146807 A    4/1985
JP  S58143947 A  8/1983
WO  03055644 A1  7/2003

OTHER PUBLICATIONS

International Search Report and Written Opinion of the International Searching Authority, issued in corresponding International Application No. PCT/US2018/050510, filed Sep. 11, 2018, 14 pages.

*Primary Examiner* — George B Nguyen
(74) *Attorney, Agent, or Firm* — Cozen O'Connor

(57) ABSTRACT

Air flow management systems and methods to facilitate the delivery of abrasives to an abrasive fluid jet cutting head are provided which enable the makeup of the discharged abrasive fluid jet to be controlled or manipulated in a particularly advantageous manner. The methods may include continuously or periodically measuring a volumetric flow rate of air (or other abrasive material carrier fluid) moving through an abrasive feed passageway at one or more measurement locations and adjusting the volumetric flow rate of air (or other abrasive material carrier fluid) moving through the abrasive feed passageway based at least in part on said measuring. Systems and methods for diagnosing changes in operational conditions and/or changes in the condition of one or more components of an abrasive fluid jet cutting system are also provided.

44 Claims, 10 Drawing Sheets

(51) Int. Cl.
  *G05B 19/4099*  (2006.01)
  *B24C 5/04*  (2006.01)
(52) U.S. Cl.
  CPC ............ *G05B 19/4099* (2013.01); *G05B 2219/45036* (2013.01)
(58) Field of Classification Search
  USPC ...... 451/1, 2, 99, 38–40, 5, 201; 222/52, 53, 222/55; 700/281, 282, 283
  See application file for complete search history.

(56) References Cited

U.S. PATENT DOCUMENTS

| | | | |
|---|---|---|---|
| 3,815,286 A | 6/1974 | Piet | |
| 4,420,957 A | 12/1983 | Weber | |
| 4,583,329 A * | 4/1986 | Lang | B24C 7/0076 451/40 |
| 4,934,111 A | 6/1990 | Hashish et al. | |
| 5,327,755 A | 7/1994 | Thompson | |
| 5,407,379 A | 4/1995 | Shank et al. | |
| 5,412,910 A | 5/1995 | Woodson et al. | |
| 5,441,441 A * | 8/1995 | Cook | B08B 3/02 451/36 |
| 5,531,634 A * | 7/1996 | Schott | B24C 5/04 134/7 |
| 5,556,325 A * | 9/1996 | Shank, Jr. | B24C 1/003 451/100 |
| 5,588,901 A * | 12/1996 | Rubey, III | B08B 7/00 134/21 |
| 5,616,067 A * | 4/1997 | Goenka | B24C 1/003 239/318 |
| 5,643,058 A * | 7/1997 | Erichsen | B24C 1/045 451/100 |
| 6,021,682 A * | 2/2000 | Zeng | B24C 1/045 73/866 |
| 6,155,245 A * | 12/2000 | Zanzuri | B24C 1/045 125/1 |
| 6,238,275 B1 | 5/2001 | Metcalf et al. | |
| 6,739,950 B1 * | 5/2004 | Kruse | B05D 7/222 451/28 |
| 6,766,216 B2 | 7/2004 | Erichsen et al. | |
| 6,827,637 B2 * | 12/2004 | Lewin | B24C 7/0023 251/61.1 |
| 7,125,322 B1 * | 10/2006 | Champaigne | B24C 1/045 451/89 |
| 8,342,912 B2 | 1/2013 | Funatsu et al. | |
| 2003/0029934 A1 * | 2/2003 | Hashish | B24C 1/045 239/423 |
| 2003/0047495 A1 * | 3/2003 | Olejnik | B24C 1/045 209/734 |
| 2009/0247048 A1 * | 10/2009 | Olsen | B24B 57/02 451/2 |
| 2009/0318064 A1 * | 12/2009 | Hashish | B24C 1/045 451/36 |
| 2010/0180738 A1 | 7/2010 | Tavger | |
| 2012/0196516 A1 | 8/2012 | Funatsu et al. | |
| 2014/0045409 A1 * | 2/2014 | Zhang | B24C 7/0046 451/2 |
| 2014/0220861 A1 * | 8/2014 | Champaigne | B24C 7/00 451/2 |
| 2015/0174732 A1 * | 6/2015 | Raghavan | B24C 9/006 451/2 |
| 2017/0151650 A1 * | 6/2017 | Miller | B24C 7/0023 |
| 2018/0080734 A1 * | 3/2018 | Miller | B24C 1/045 |

\* cited by examiner

AIR FLOW MANAGEMENT SYSTEMS AND METHODS TO FACILITATE THE DELIVERY OF ABRASIVES TO AN ABRASIVE FLUID JET CUTTING HEAD

BACKGROUND

Technical Field

This disclosure is related to abrasive fluid jet cutting systems, and, in particular, to air flow management systems and methods to facilitate the delivery of abrasives to an abrasive fluid jet cutting head.

Description of the Related Art

High-pressure fluid jets, including high-pressure abrasive waterjets, are used to cut a wide variety of materials in many different industries. Systems for generating high-pressure abrasive waterjets are currently available, such as, for example, the Mach 4™ five-axis abrasive waterjet system manufactured by Flow International Corporation, and other abrasive waterjet systems available from KMT Waterjet Systems, Inc. The terms "high-pressure fluid jet" and "jet" should be understood to incorporate all types of high-pressure fluid jets, including but not limited to high-pressure waterjets and high-pressure abrasive waterjets. In such systems, high-pressure fluid, typically water, flows through an orifice of an orifice unit in a cutting head to form a high-pressure jet, into which abrasive particles may be combined as the jet flows through a mixing chamber and a mixing tube to form a high-pressure abrasive waterjet. The high-pressure abrasive fluid jet is typically discharged from the mixing tube and directed toward a workpiece to cut the workpiece along a designated path or otherwise process a workpiece or work surface.

Various systems are currently available to move a high-pressure fluid jet along a designated path. Such systems may commonly be referred to as, for example, three-axis and five-axis machines. Conventional three-axis machines mount the cutting head in such a way that it can move along an x-y plane and perpendicularly thereto along a z-axis, namely toward and away from the workpiece. In this manner, the high-pressure fluid jet generated by the cutting head is moved along the designated path in an x-y plane, and is raised and lowered relative to the workpiece, as may be desired. Conventional five-axis machines work in a similar manner but provide for movement about two additional rotary axes. Other systems may include a cutting head mounted to an articulated robotic arm, such as, for example, a six-axis robotic arm which articulates about six separate rotary axes.

Computer-aided manufacturing (CAM) processes may be used to drive or control such conventional machines along a designated path, such as by enabling two-dimensional or three-dimensional models of workpieces generated using computer-aided design (i.e., CAD models) to be used to generate code to drive the machines. For example, a CAD model may be used to generate instructions to drive the appropriate controls and motors of the machine to manipulate the machine about its translational and/or rotary axes to cut or process a workpiece as reflected in the model.

During the fluid jet cutting process, dimensional accuracy and cut quality may be dependent on, among other things, the makeup of the discharged abrasive fluid jet, including the amount of abrasives and abrasive material carrier fluid (e.g., air) that may be entrained in the fluid jet before being discharged from the system to process a workpiece or a work surface. Accordingly, improved systems for controlling or manipulating the makeup of the discharged abrasive fluid jet may be desirable.

BRIEF SUMMARY

Embodiments described herein provide air flow management systems and methods to facilitate the delivery of abrasives to an abrasive fluid jet cutting head, and enable the makeup of the discharged abrasive fluid jet to be controlled or manipulated in a particularly advantageous manner. In addition, embodiments provide systems and methods for diagnosing changes in operational conditions and/or changes in the condition of one or more abrasive fluid jet cutting system components based at least in part on air flow data obtained from air moving through an abrasive delivery conduit.

In one embodiment, a method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head may be summarized as including continuously or periodically measuring, throughout at least a portion of a processing operation during which the abrasive waterjet is discharged from the abrasive waterjet cutting head, a volumetric flow rate of air moving through the abrasive feed passageway at one or more measurement locations; and adjusting the volumetric flow rate of air moving through the abrasive feed passageway based at least in part on said measuring of the volumetric flow rate of the air moving through the abrasive feed passageway at the one or more measurement locations. Continuously or periodically measuring the volumetric flow rate of air moving through the abrasive feed passageway may include measuring a standard air flow rate through the abrasive feed passageway at the at one or more measurement locations. Adjusting the volumetric flow rate of the air moving through the abrasive feed passageway may include adjusting the volumetric flow rate such that the volumetric flow rate of air input into the abrasive waterjet cutting head that mixes with the high-pressure water and the abrasive material of the abrasive waterjet is substantially constant. Adjusting the volumetric flow rate of the air moving through the abrasive feed passageway may include adjusting the volumetric flow rate such that the volumetric flow rate of air input into the abrasive waterjet cutting head that mixes with the high-pressure water and the abrasive material of the abrasive waterjet is maintained at a predetermined value ±5%. Continuously or periodically measuring the volumetric flow rate of the air moving through the abrasive feed passageway at the one or more measurement locations may include measuring the volumetric flow rate at a location of the abrasive feed passageway upstream of an abrasive material feed location where the abrasive material enters the abrasive feed passageway from the abrasive material source.

Adjusting the volumetric flow rate of the air moving through the abrasive feed passageway may include introducing air into the abrasive feed passageway at a flow booster location downstream of an abrasive material feed location where the abrasive material enters the abrasive feed passageway from the abrasive material source and upstream of an abrasive material input of the abrasive waterjet cutting head. Adjusting the volumetric flow rate of the air moving through the abrasive feed passageway may further include withdrawing air from the abrasive feed passageway at a flow dump location downstream of the flow booster location and upstream of the abrasive material input of the abrasive waterjet cutting head. Introducing the air into the abrasive feed passageway at the flow booster location may include directing air at positive pressure into the abrasive feed passageway in a direction having a component aligned with the direction of travel of the abrasive material moving through the abrasive feed passageway. The method may further include measuring a volumetric flow rate of the air introduced into the abrasive feed passageway at the flow booster location, and wherein adjusting the volumetric flow rate of the air moving through the abrasive feed passageway is based at least in part on the volumetric flow rate of the air introduced into the abrasive feed passageway at the flow booster location.

Adjusting the volumetric flow rate of the air moving through the abrasive feed passageway may include withdrawing air from the abrasive feed passageway at a flow dump location downstream of an abrasive material feed location where the abrasive material enters the abrasive feed passageway from the abrasive material source and upstream of an abrasive material input of the abrasive waterjet cutting head. Withdrawing the air from the abrasive feed passageway at the flow dump location may include withdrawing air in a direction having a component aligned opposite the direction of travel of the abrasive material moving through the abrasive feed passageway. The method may further include measuring a volumetric flow rate of the air withdrawn from the abrasive feed passageway at the flow dump location, and wherein adjusting the volumetric flow rate of the air moving through the abrasive feed passageway is based at least in part on the volumetric flow rate of the air withdrawn from the abrasive feed passageway at the flow dump location. The flow dump location may be provided near the abrasive material input of the abrasive waterjet cutting head such that momentum of the abrasive material carried by the air moving through the abrasive feed passageway is sufficient to carry the abrasive material into a mixing chamber of the abrasive waterjet cutting head despite the withdrawing of the air at the flow dump location.

The method may further include operating a suction device to assist in drawing air through the abrasive feed passageway, the suction device being coupled to the abrasive waterjet cutting head at a location apart from the abrasive feed passageway.

The method may further include determining a desired air flow rate based on one or more operating parameters of the abrasive waterjet cutting system, and wherein adjusting the volumetric flow rate of the air moving through the abrasive feed passageway may include adjusting the volumetric flow rate such that the volumetric flow rate of air mixing with the high-pressure water and the abrasive material of the abrasive waterjet coincides approximately with the desired air flow rate. The operating parameters of the abrasive waterjet cutting system may include at least one of the following: an operating pressure; an orifice size of an orifice unit used to generate the abrasive waterjet; and one or more dimensional characteristics of a nozzle or mixing tube through which the abrasive waterjet is discharged from the abrasive waterjet cutting system.

The method may further include obtaining air flow data associated with the flow of air through the abrasive feed passageway; and based at least in part on said air flow data, ascertaining a change in condition of one or more components of the abrasive waterjet cutting system. The method may further include providing one or more indications associated with the change in condition of the one or more components of the abrasive waterjet cutting system to a user.

The method may further include monitoring air flow data associated with the flow of air through the abrasive feed passageway to identify a clog event based on a substantial change in the volumetric flow rate of the air moving through the abrasive feed passageway.

Adjusting the volumetric flow rate of the air moving through the abrasive feed passageway may include adjusting the volumetric flow rate during one or more material or work surface processing operations to be higher than the volumetric flow rate during a material cutting operation so as to diffuse the abrasive waterjet during said one or more material or work surface processing operations. Adjusting the volumetric flow rate of the air moving through the abrasive feed passageway may include adjusting the volumetric flow rate during a material piercing operation to be higher than a subsequent material cutting operation.

The method may further include during the at least the a portion of the processing operation, manipulating the abrasive waterjet cutting head in space to change an orientation of the abrasive waterjet discharged from the abrasive waterjet cutting head, and wherein adjusting the volumetric flow rate of the air moving through the abrasive feed passageway includes adjusting the volumetric flow rate based at least in part on the orientation of the abrasive waterjet discharged from the abrasive waterjet cutting head.

The method may further include obtaining air temperature data and/or air moisture content data, and wherein adjusting the volumetric flow rate of the air moving through the abrasive feed passageway may be based at least in part on said air temperature data and/or said air moisture content data.

According to another embodiment, a method of operating an abrasive fluid jet cutting system having a high-pressure fluid source, an abrasive material source, an abrasive fluid jet cutting head configured to generate an abrasive fluid jet from high-pressure fluid supplied by the high-pressure fluid source and abrasive material supplied by the abrasive material source, and an abrasive feed passageway through which the abrasive material from the abrasive material source flows to the abrasive fluid jet cutting head may be summarized as including continuously or periodically measuring, throughout at least a portion of a processing operation during which the abrasive fluid jet is discharged from the abrasive fluid jet cutting head, a flow rate of an abrasive material carrier fluid moving through the abrasive feed passageway at one or more measurement locations; and adjusting the flow rate of the abrasive material carrier fluid moving through the abrasive feed passageway based at least in part on said measuring of the flow rate of the abrasive material carrier fluid moving through the abrasive feed passageway at the one or more measurement locations.

According to another embodiment, an abrasive waterjet cutting system may be summarized as including a high-pressure water source; an abrasive material source; an abrasive waterjet cutting head configured to generate an abrasive waterjet from high-pressure water supplied by the high-pressure water source and abrasive material supplied by the abrasive material source, the abrasive waterjet cutting head including a mixing chamber and an abrasive material input through which the abrasive material is supplied to the mixing chamber of the abrasive waterjet cutting head; an abrasive feed passageway in fluid communication with the abrasive material input of the abrasive waterjet cutting head, the abrasive feed passageway including an abrasive material feed location through which the abrasive material from the abrasive material source is fed into the abrasive feed passageway for supply to the abrasive waterjet cutting head; an air flow sensor positioned to measure a volumetric flow rate of air moving through the abrasive feed passageway at a measurement location; an air flow control device configured to control the flow of air moving through the abrasive feed passageway; and a control system communicatively coupled to the air flow sensor and the air flow control device, the control system being configured to continuously or periodically measure, throughout at least a portion of a processing operation during which the abrasive waterjet is discharged from the abrasive waterjet cutting head, the flow rate of air moving through the abrasive feed passageway at the measurement location via the air flow sensor, and to adjust the flow rate of air moving through the abrasive feed passageway via the air flow control device based at least in part on said measurement of the flow rate of the air moving through the abrasive feed passageway at the measurement location. The measurement location may be upstream of the abrasive material feed location.

The abrasive waterjet cutting system may further include an air flow booster device coupled to the abrasive feed passageway at an air flow booster location downstream of the abrasive material feed location and upstream of the abrasive material input of the abrasive waterjet cutting head. The air flow booster device may be coupled to the abrasive feed passageway to direct air into the abrasive feed passageway in a direction having a component aligned with a direction of travel of the abrasive material moving through the abrasive feed passageway. The abrasive waterjet cutting system may further include a supplemental air flow sensor positioned to measure a volumetric flow rate of air introduced into the abrasive feed passageway by the air flow booster device at the air flow booster location.

The abrasive waterjet cutting system may further include an air flow suction device coupled to the abrasive feed passageway at a flow dump location downstream of the abrasive material feed location and upstream of the abrasive material input of the abrasive waterjet cutting head. The air flow suction device may be coupled to the abrasive feed passageway to withdraw air in a direction having a component aligned opposite a direction of travel of the abrasive material moving through the abrasive feed passageway. The abrasive waterjet cutting system may further include a supplemental air flow sensor positioned to measure a volumetric flow rate of the air withdrawn from the abrasive feed passageway by the air flow suction device at the flow dump location. The flow dump location may be provided near the abrasive material input of the abrasive waterjet cutting head such that momentum of the abrasive material carried by the air moving through the abrasive feed passageway is sufficient to carry the abrasive material into the mixing chamber of the abrasive waterjet cutting head despite the withdrawal of air by the air flow suction device at the flow dump location.

The abrasive waterjet cutting system may further include a suction device to assist in drawing air through the abrasive feed passageway, the suction device coupled to the abrasive waterjet cutting head at a location apart from the abrasive feed passageway.

The abrasive waterjet cutting system may further include one or more sensors configured to obtain air temperature and/or air moisture content data from which to adjust the flow of air through the abrasive feed passageway.

According to yet another embodiment, a method of operating an abrasive waterjet cutting system may be summarized as including: continuously or periodically measuring, throughout at least a portion of a processing operation during which an abrasive waterjet is discharged from an abrasive waterjet cutting head, a volumetric flow rate of air moving through an abrasive feed passageway at one or more measurement locations to generate air flow data associated with the flow of air through the abrasive feed passageway; and, based at least in part on said air flow data, ascertaining a change in condition of one or more components of the abrasive waterjet cutting system. The method may further include providing one or more indications associated with the change in condition of the one or more components of the abrasive waterjet cutting system to a user, and/or shutting down the abrasive waterjet cutting system in response to the change in condition of the one or more components. Ascertaining the change in condition of the one or more components of the abrasive waterjet cutting system may include identifying an excessive wear condition of at least one of the following components: a mixing tube through which the abrasive waterjet is discharged; an orifice member through which high-pressure water passes to generate a high-pressure waterjet to be mixed with abrasive material; and a delivery conduit which at least partially defines the abrasive feed passageway. Continuously or periodically measuring the volumetric flow rate of the air moving through the abrasive feed passageway at the one or more measurement locations may include measuring the volumetric flow rate at a location of the abrasive feed passageway upstream of an abrasive material feed location where abrasive material enters the abrasive feed passageway from an abrasive material source.

According to yet another embodiment, a method of operating an abrasive waterjet cutting system may be summarized as including: continuously or periodically measuring, throughout at least a portion of a processing operation during which an abrasive waterjet is discharged from an abrasive waterjet cutting head, a volumetric flow rate of air moving through an abrasive feed passageway at one or more measurement locations to generate air flow data associated with the flow of air through the abrasive feed passageway; and, based at least in part on said air flow data, identifying a change in an operational condition of the abrasive waterjet cutting system. The method may further include providing one or more indications associated with the change in operational condition of the abrasive waterjet cutting system to a user, and/or shutting down the abrasive waterjet cutting system in response to the change in operational condition. Ascertaining the change in the operational condition of the abrasive waterjet cutting system may include identifying an abrasive material clog event based on a substantial change in the volumetric flow rate of the air moving through the abrasive feed passageway. In such instances, the method may further include initiating a flush sequence in which the abrasive feed passageway is flushed with a fluid to clear obstructions. Continuously or periodically measuring the volumetric flow rate of the air moving through the abrasive feed passageway at the one or more measurement locations may include measuring the volumetric flow rate at a location of the abrasive feed passageway upstream of an abrasive material feed location where abrasive material enters the abrasive feed passageway from an abrasive material source.

According to still yet another embodiment, an abrasive waterjet cutting system may be summarized as including: a high-pressure water source; an abrasive material source; an abrasive waterjet cutting head configured to generate an abrasive waterjet from high-pressure water supplied by the high-pressure water source and abrasive material supplied by the abrasive material source, the abrasive waterjet cutting head including a mixing chamber and an abrasive material input through which the abrasive material is supplied to the mixing chamber of the abrasive waterjet cutting head; an abrasive feed passageway in fluid communication with the abrasive material input of the abrasive waterjet cutting head, the abrasive feed passageway including an abrasive material feed location through which the abrasive material from the abrasive material source is fed into the abrasive feed passageway for supply to the abrasive waterjet cutting head; an air flow sensor positioned to measure a volumetric flow rate of air moving through the abrasive feed passageway at a measurement location; and a control system communicatively coupled to the air flow sensor, the control system being configured to continuously or periodically measure, throughout at least a portion of a processing operation during which the abrasive waterjet is discharged from the abrasive waterjet cutting head, the volumetric flow rate of air moving through the abrasive feed passageway at the measurement location via the air flow sensor to generate air flow data, and to ascertain a change in condition of one or more components of the abrasive waterjet cutting system and/or a change in an operational condition of the abrasive waterjet cutting system based at least in part on said air flow data.

The control system may be further configured to provide one or more indications associated with the change in the condition of the one or more components of the abrasive waterjet cutting system and/or the change in the operational condition of the abrasive waterjet cutting system to a user, and/or to shut down the abrasive waterjet cutting system in response to the change in the condition of the one or more components and/or the change in the operational condition. The control system may be configured to identify an excessive wear condition of at least one of the following components based at least in part on the air flow data: a mixing tube through which the abrasive waterjet is discharged; an orifice member through which the high-pressure water passes to generate a high-pressure waterjet to be mixed with the abrasive material; and a delivery conduit which at least partially defines the abrasive feed passageway. The control system may be configured to identify an abrasive material clog event based on a substantial change in the volumetric flow rate of the air moving through the abrasive feed passageway. The measurement location may be upstream of an abrasive material feed location where the abrasive material enters the abrasive feed passageway from the abrasive material source.

DETAILED DESCRIPTION

Figure 1:
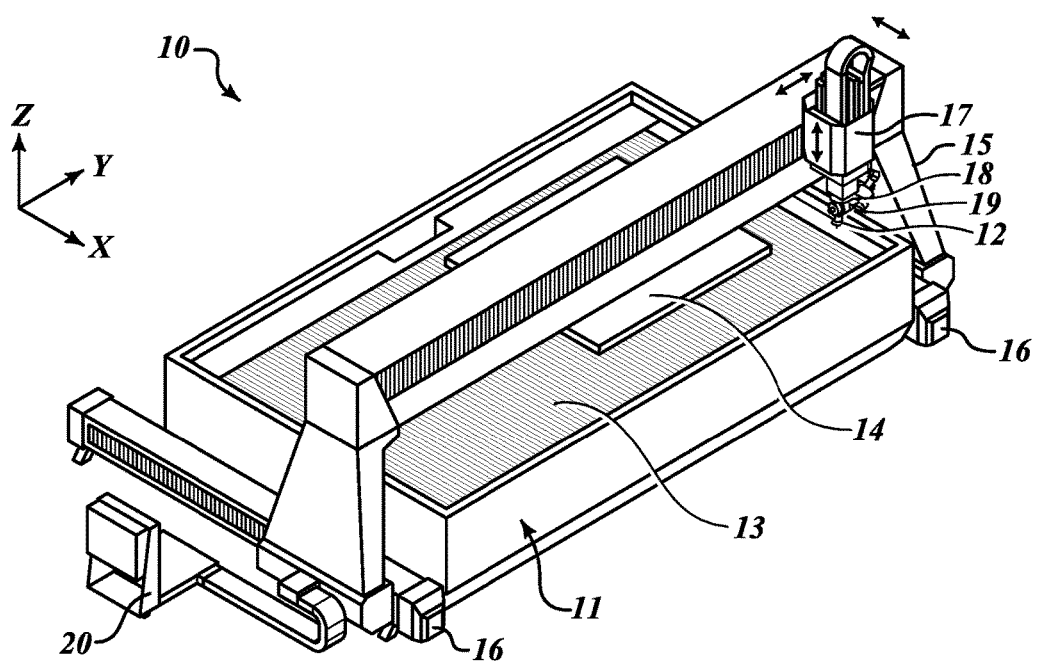
FIG. 1 is an isometric view of an example high-pressure fluid jet cutting system, according to one embodiment, which comprises a multi-axis manipulator (e.g., gantry motion system) supporting a waterjet cutting head at a working end thereof.

In the following description, certain specific details are set forth in order to provide a thorough understanding of various disclosed embodiments. However, one of ordinary skill in the relevant art will recognize that embodiments may be practiced without one or more of these specific details. In other instances, well-known structures associated with abrasive fluid jet cutting systems and methods of operating the same may not be shown or described in detail to avoid unnecessarily obscuring descriptions of the embodiments. For instance, well-known control systems and drive components may be integrated into the abrasive fluid jet cutting systems to facilitate movement of the abrasive fluid jet cutting head relative to the workpiece or work surface to be processed. These systems may include drive components to manipulate the cutting head about multiple rotational and translational axes, as is common in multi-axis manipulators of abrasive fluid jet cutting systems. Example abrasive fluid jet cutting systems may include a waterjet cutting head coupled to a gantry-type motion system (as shown in FIG. 1), a robotic arm motion system, or other motion system for moving the cutting head relative to a workpiece or work surface. In other instances, a robotic arm motion system or other motion system may manipulate the workpiece relative to a stationary cutting head.

Unless the context requires otherwise, throughout the specification and claims which follow, the word "comprise"

and variations thereof, such as "comprises" and "comprising," are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Embodiments described herein provide air flow management systems and methods to facilitate the delivery of abrasives to an abrasive fluid jet cutting head, and enable the makeup of the discharged abrasive fluid jet to be controlled or manipulated in a particularly advantageous manner.

As used herein, the term cutting head or cutting head assembly may refer generally to an assembly of components at a working end of the fluid jet (e.g., waterjet) machine or system, and may include, for example, an orifice member, such as a jewel orifice, through which fluid passes during operation to generate a high-pressure fluid jet, a nozzle component (e.g., mixing tube) for discharging the high-pressure fluid jet and surrounding structures and devices coupled directly or indirectly thereto to move in unison therewith. The cutting head may also be referred to as an end effector or nozzle assembly.

FIG. 1 shows an example embodiment of an abrasive fluid jet cutting system in the form of an abrasive waterjet cutting system 10. The abrasive waterjet cutting system 10 includes a catcher tank assembly 11 having a work support surface 13 (e.g., an arrangement of slats) that is configured to support a workpiece 14 to be processed by the system 10. The waterjet cutting system 10 further includes a bridge assembly 15 that is movable along a pair of base rails 16 and straddles the catcher tank assembly 11. In operation, the bridge assembly 15 can move back and forth along the base rails 16 with respect to a translational axis X to position a cutting head 12 of the system 10 for processing the workpiece 14. A tool carriage 17 is movably coupled to the bridge assembly 15 to translate back and forth along another translational axis Y, which is aligned perpendicularly to the aforementioned translational axis X. The tool carriage 17 may be configured to raise and lower the cutting head 12 along yet another translational axis Z to move the cutting head 12 toward and away from the workpiece 14. One or more manipulable links or members may also be provided intermediate the cutting head 12 and the tool carriage 17 to provide additional functionality.

As an example, the waterjet cutting system 10 may include a forearm 18 rotatably coupled to the tool carriage 17 for rotating the cutting head 12 about an axis of rotation, and a wrist 19 rotatably coupled to the forearm 18 to rotate the cutting head 12 about another axis of rotation. In combination, the rotational axes of the forearm 18 and wrist 19 can enable the cutting head 12 to be manipulated in a wide range of orientations relative to the workpiece 14 to facilitate, for example, cutting of complex profiles.

During operation, movement of the cutting head 12 with respect to each of the translational axes and one or more rotational axes may be accomplished by various conventional drive components and an appropriate control system 20. The control system may generally include, without limitation, one or more computing devices, such as processors, microprocessors, digital signal processors (DSP), application-specific integrated circuits (ASIC), and the like. To store information, the control system may also include one or more storage devices, such as volatile memory, non-volatile memory, read-only memory (ROM), random access memory (RAM), and the like. The storage devices can be coupled to the computing devices by one or more buses. The control system may further include one or more input devices (e.g., displays, keyboards, touchpads, controller modules, or any other peripheral devices for user input) and output devices (e.g., display screens, light indicators, and the like). The control system can store one or more programs for processing any number of different workpieces according to various cutting head movement instructions. The control system may also control operation of other components, such as, for example, a secondary fluid source, a suction device and/or a pressurized gas source coupled to the abrasive waterjet cutting head assemblies and components described herein. The control system, according to one embodiment, may be provided in the form of a general purpose computer system. The computer system may include components such as a CPU, various I/O components, storage, and memory. The I/O components may include a display, a network connection, a computer-readable media drive, and other I/O devices (a keyboard, a mouse, speakers, etc.). A control system manager program may be executing in memory, such as under control of the CPU, and may include functionality related to, among other things, routing high-pressure water through the abrasive waterjet cutting systems described herein, and managing the flow of air through an abrasive feed passageway to facilitate the delivery of abrasives to the abrasive fluid jet cutting head.

Further example control methods and systems for waterjet cutting systems, which include, for example, CNC functionality, and which are applicable to the abrasive waterjet cutting systems described herein, are described in Flow's U.S. Pat. No. 6,766,216, which is incorporated herein by reference in its entirety. In general, computer-aided manufacturing (CAM) processes may be used to efficiently drive or control an abrasive waterjet cutting head along a designated path, such as by enabling two-dimensional or three-dimensional models of workpieces generated using computer-aided design (i.e., CAD models) to be used to generate code to drive the machines. For example, in some instances, a CAD model may be used to generate instructions to drive the appropriate controls and motors of an abrasive waterjet cutting system to manipulate the cutting head about various translational and/or rotational axes to cut or process a workpiece as reflected in the CAD model. Details of the control system, conventional drive components and other well-known systems associated with abrasive waterjet cutting systems, however, are not shown or described in detail to avoid unnecessarily obscuring descriptions of the embodiments. Other known systems associated with waterjet cutting systems include, for example, a high-pressure fluid source (e.g., direct drive and intensifier pumps with pressure ratings ranging from 40,000 psi to 110,000 psi and higher) for supplying high-pressure fluid (typically water) to the cutting head.

Figure 2:
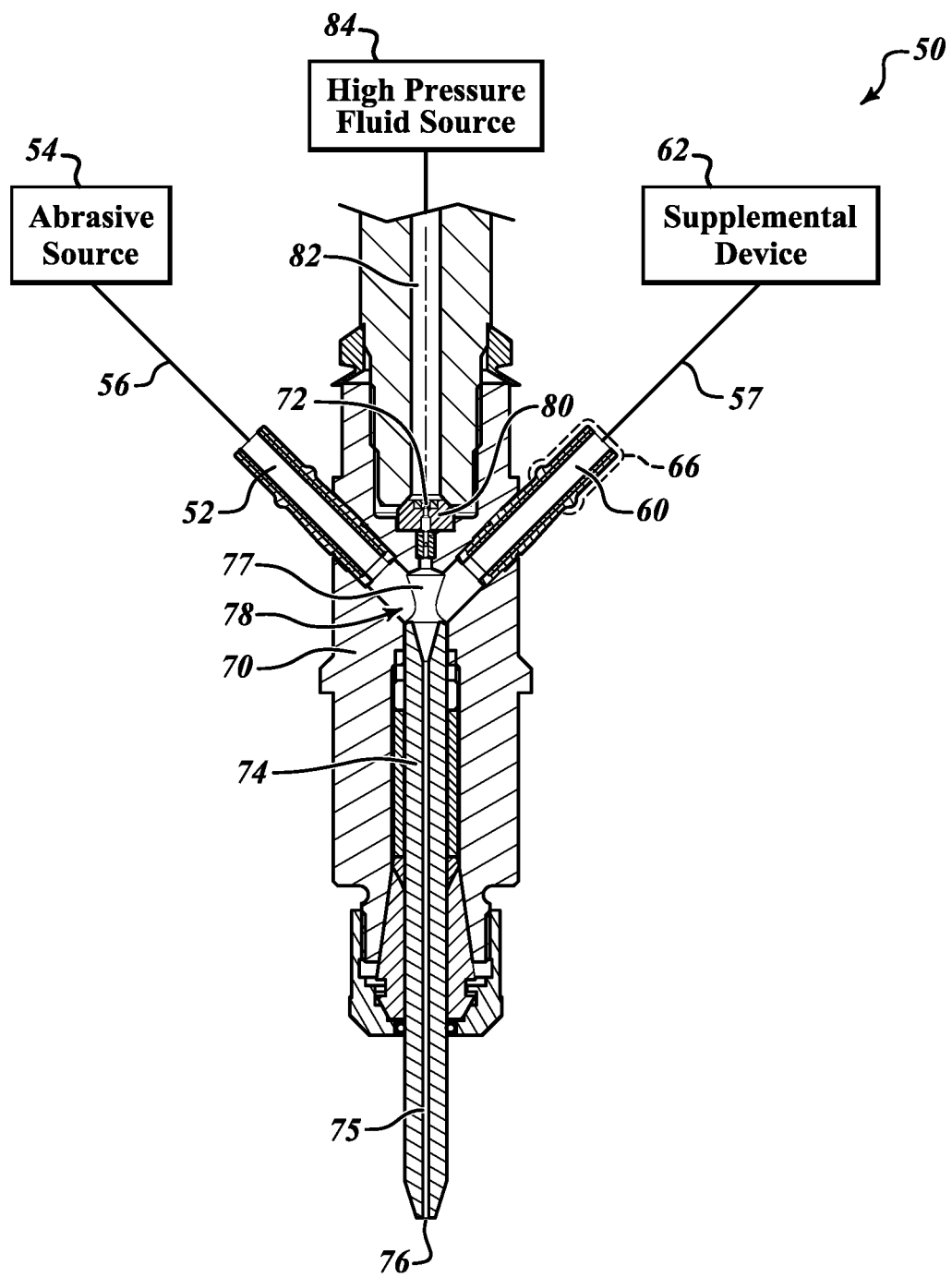
FIG. 2 is a cross-sectional view of a waterjet cutting head, according to one embodiment, which is operable to generate an abrasive waterjet in accordance with aspects of the air management systems and methods disclosed herein.

FIG. 2 shows an example of an abrasive waterjet cutting head 50 that may be used in connection with the air management methods and systems disclosed herein. The cutting head 50 includes an abrasive inlet 52 coupled to an abrasive source 54 via an abrasive feed passageway 56. The cutting head 50 further includes a supplemental port 60 that may be coupled to a supplemental device 62, such as, for example, a suction device to assist in drawing abrasives into the cutting head 50. In other instances, the supplemental device 62 may be a secondary abrasive feed source, a pressurized air source, or other device that assists or augments the operation of the cutting head 50. In some instances, a supplemental device 62 may not be provided and the supplemental port 60 may be sealed with a cap 66, blocked by a valve, or otherwise omitted.

With continued reference to FIG. 2, the cutting head 50 also includes a cutting head body 70, an orifice member 72 for producing a fluid jet within the cutting head body 70, and a mixing tube 74 coupled to the cutting head body 70. The cutting head body 70 has an interior surface 77 that defines at least a portion of a mixing chamber 78. In some embodiments, including the embodiment illustrated in FIG. 2, the mixing chamber 78 is generally the space between an orifice mount 80, which supports the orifice member 72, and the mixing tube 74. The abrasive inlet 52 defines at least a portion of the abrasive feed passageway 56 between the abrasive source 54 and the mixing chamber 78. The supplemental port 60, when provided, defines at least a portion of a flow passageway 57 between the supplemental device 62 and the mixing chamber 78.

The cutting head body 70 can have a one-piece construction and can be made, in whole or in part, of one or more metals, metal alloys, or the like. The cutting head body 70 may include threads or other coupling features for coupling to other components of the cutting head 50. The orifice mount 80 is fixed with respect to the cutting head body 70 and includes a recess dimensioned to receive and hold the orifice member 72. The orifice member 72 is kept in alignment with the mixing chamber 78, a passageway 75 of the mixing tube 74, and an upstream passageway 82 in fluid communication with a high-pressure fluid source 84. The orifice member 72, in some embodiments, is a jewel orifice or other fluid jet or cutting stream producing device used to achieve the desired flow characteristics of the resultant fluid jet. The opening of the orifice member 72 can have a diameter in a range of about 0.001 inch (0.025 mm) to about 0.02 inch (0.5 mm). Openings with other diameters can also be used, if needed or desired.

The orifice mount 80 defines an upstream end of the mixing chamber 78, and the mixing tube 74 defines a downstream end of the mixing chamber 78. The mixing chamber 78 includes a relatively wide central region in which abrasives (e.g., garnet particles) from the abrasive source 54 may be entrained in the fluid jet. The illustrated mixing chamber 78 has a cross-sectional area that is larger than a cross-sectional area of the passageway 75 of the mixing tube 74. The illustrated mixing chamber 78 of FIG. 2 is a single-stage entrainment chamber in which substantially the entire entrainment process occurs. A stream of abrasives can be continuously entrained in at least a portion of a section of the fluid jet between the orifice mount 80 and the mixing tube 74. The illustrated fluid jet exits the orifice member 72 into the mixing chamber 78. Abrasives fed or drawn into the mixing chamber 78 in accordance with aspects of the air management methods and systems disclosed herein are entrained in the fluid jet to form an abrasive fluid jet that flows through the passageway 75 of the mixing tube 74. The abrasives may be entrained before entering an upstream end of the mixing tube 74. The entrained abrasives may continue to mix together with the fluid jet while traveling along the passageway 75 of the mixing tube 74. A fluid jet ladened with abrasives is ultimately discharged from an outlet 76 of the mixing tube 74 for processing a workpiece or work surface.

According to various embodiments, air flow management systems and methods to facilitate the delivery of abrasives to an abrasive waterjet cutting head (e.g., cutting head 50 of FIG. 2) are provided which enable the makeup of the discharged abrasive fluid jet to be controlled or manipulated in a particularly advantageous manner. The methods may include continuously or periodically measuring a volumetric flow rate of air (or other abrasive material carrier fluid) moving through an abrasive feed passageway (e.g., abrasive feed passageway 56 of FIG. 2) at one or more measurement locations, and adjusting the volumetric flow rate of air (or other abrasive material carrier fluid) moving through the abrasive feed passageway based at least in part on said measuring, as described in further detail herein.

By way of background, and with reference to FIG. 2, air flow is commonly used as an abrasive material carrier fluid to carry abrasives from the abrasive source 54 (e.g., a storage/metering hopper) to the cutting head 50. When the waterjet is fired (by opening a valve), high-pressure water passes through the orifice member 72 to generate a fluid jet as previously described. The fluid jet then moves through the mixing tube 74, which causes the pressure to drop in the mixing chamber 78 between the orifice exit plane and the entry of the mixing tube 74. This pressure drop allows ambient air and abrasives to be entrained into the cutting head 50 to mix with the waterjet before the jet is discharged from the mixing tube 74. The flow rate of air moving into the cutting head 50 under such an abrasive waterjet configuration, however, typically does not remain constant due to several factors. Such factors may include one or more of the following:

Mixing Tube Wear.

Mixing tube wear causes the air flow rate to change due to the change in the flow area and shape of the passageway 75 extending through the mixing tube 74. For instance, air flow rate may initially increase as the flow area increases. Additional wear, on the other hand, may reduce the pressure drop associated with the fluid moving through the mixing tube 74 and may thus "weaken" the vacuum in the mixing chamber 78 and result in a reduced air flow rate through the abrasive feed passageway 56.

Orifice Member Wear.

Orifice member wear or edge chipping or rounding can result in a faster spreading jet which may increase the vacuum level in the mixing chamber 78, resulting in a greater air flow rate through the abrasive feed passageway 56 as more air is entrained into the jet.

Increased Wall Friction.

Increased wall friction in a delivery conduit (e.g., delivery hose) defining at least a portion of the abrasive feed passageway 56 will tend to decrease the air flow rate as the pressure levels at both ends of the delivery conduit are generally fixed by system configuration.

Deformation of the Delivery Conduit.

Deformation of a delivery conduit (e.g., delivery hose) defining at least a portion of the abrasive feed passageway 56, such as "kinking" of the delivery conduit, can reduce the air flow rate through the abrasive feed passageway 56 by creating additional flow resistance.

Figure 3:
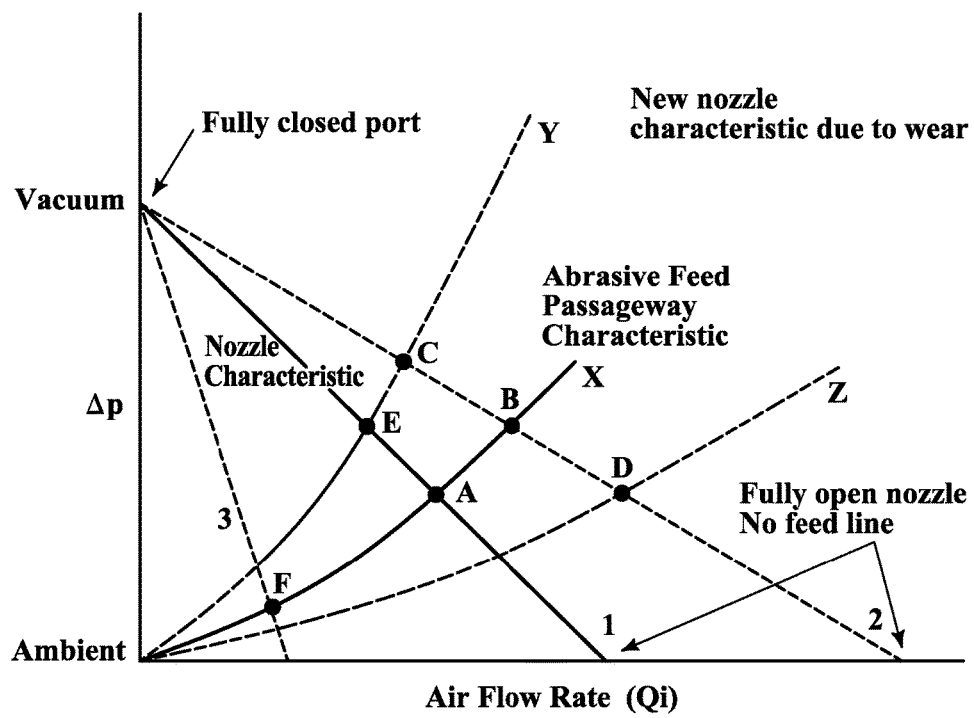
FIG. 3 is a diagram illustrating relationships between various system components and how they may affect the air flow rate through an abrasive feed passageway of a waterjet cutting system.

FIG. 3 illustrates how air flow rate through an abrasive feed passageway (also referred to as feed line) may be affected by various system components. More particularly, it illustrates the relationship between the pressure differential applied to the abrasive feed passageway and the corresponding air flow rate of air moving through the abrasive feed passageway toward the nozzle (also referred to as a mixing tube). The nozzle characteristic of an example nozzle is represented by line (1) and illustrates that the air flow rate varies from zero flow for a fully closed nozzle condition to a maximum flow for a fully open nozzle. The abrasive feed passageway characteristic of an example abrasive feed passageway is represented by line (X) and illustrates that the air flow rate through the abrasive feed passageway generally increases as the pressure differential increases. The flow rate for the example system arraignment is represented by point (A) in this case, where the nozzle characteristic line (1) intersects the abrasive feed passageway characteristic line (X). Now, if the abrasive feed passageway wall friction increases, then the abrasive feed passageway characteristic line shifts, as represented by line (Y), with the new air flow rate being represented by point (E), where the nozzle characteristic line (1) intersects the abrasive feed passageway characteristic (Y). This could also occur under the circumstances of a longer abrasive feed passageway than that of line (X), or a combination of a longer abrasive feed passageway and wall friction increases. Now, when the nozzle (e.g., mixing tube) wears out, the nozzle characteristic line shifts, as represented by line (2). As an example, a fully open nozzle condition for a worn nozzle will result in greater air flow through the abrasive feed passageway, than an unworn nozzle. In addition, smaller orifices and smaller nozzles will make the nozzle characteristic line move to the left, as represented by line (3), as the discharge passageway becomes more restrictive. In such a scenario, the air flow rate would be represented by point (F) for an abrasive feed passageway line (X).

Now, based on the required or desired abrasive flow rate, the air flow rate (and flow velocity) may or may not be sufficient based on the above characteristics. For example, air flow rate (F) will not have the same abrasive carrying capability as air flow rate (A) given the same size abrasive feed passageway. In this case, additional air may be needed to supply the required or desired amount of abrasive material.

In the case of flow rate (A), which may increase to air flow rate (B) due to changes in the characteristics of the cutting head, changes will also occur to the jet. For example, the changes may cause the jet to spread larger upon exit. In some instances, it may be desired to maintain the air flow rate at a fixed level (A) during operation to maintain the structure of the jet (which is typically over 80% air by volume) and prevent unacceptable spreading. Thus, it may be desired to manage air flow through the abrasive feed passageway by limiting air flow through the abrasive feed passageway or subtracting air flow from the abrasive feed passageway prior to reaching the cutting head.

Still further, for a relatively long abrasive feed passageway as may be needed on large gantry systems (as shown in FIG. 1), or on robotic arms, air flow will be impeded by wall friction, and if the cross-sectional area of the feed passageway is increased to allow more air flow, the flow velocity may drop to a level that prevents a robust abrasive flow condition. This is another example where additional air may be desired to "boost" the flow condition within the abrasive feed passageway.

From the discussion above, it can be appreciated that controlling the air flow rate through an abrasive feed passageway may desirable so as to maintain flow at a desired or optimal rate. This may require adding or boosting air flow through the abrasive feed passageway during operation, and/or subtracting air flow from the abrasive feed passageway during operation before it reaches the cutting head. Also, it will be appreciated that it may be desirable to eliminate, reduce, or increase air flow to affect jet performance for certain machining or cleaning operations. For example, air flow through the abrasive feed passageway may be manipulated to affect jet characteristics during certain machining procedures, such as, for example, during initial piercing of a workpiece. Air flow through the abrasive feed passageway may also be manipulated to clean or clear the passageway after a clog condition is detected.

Figure 4:
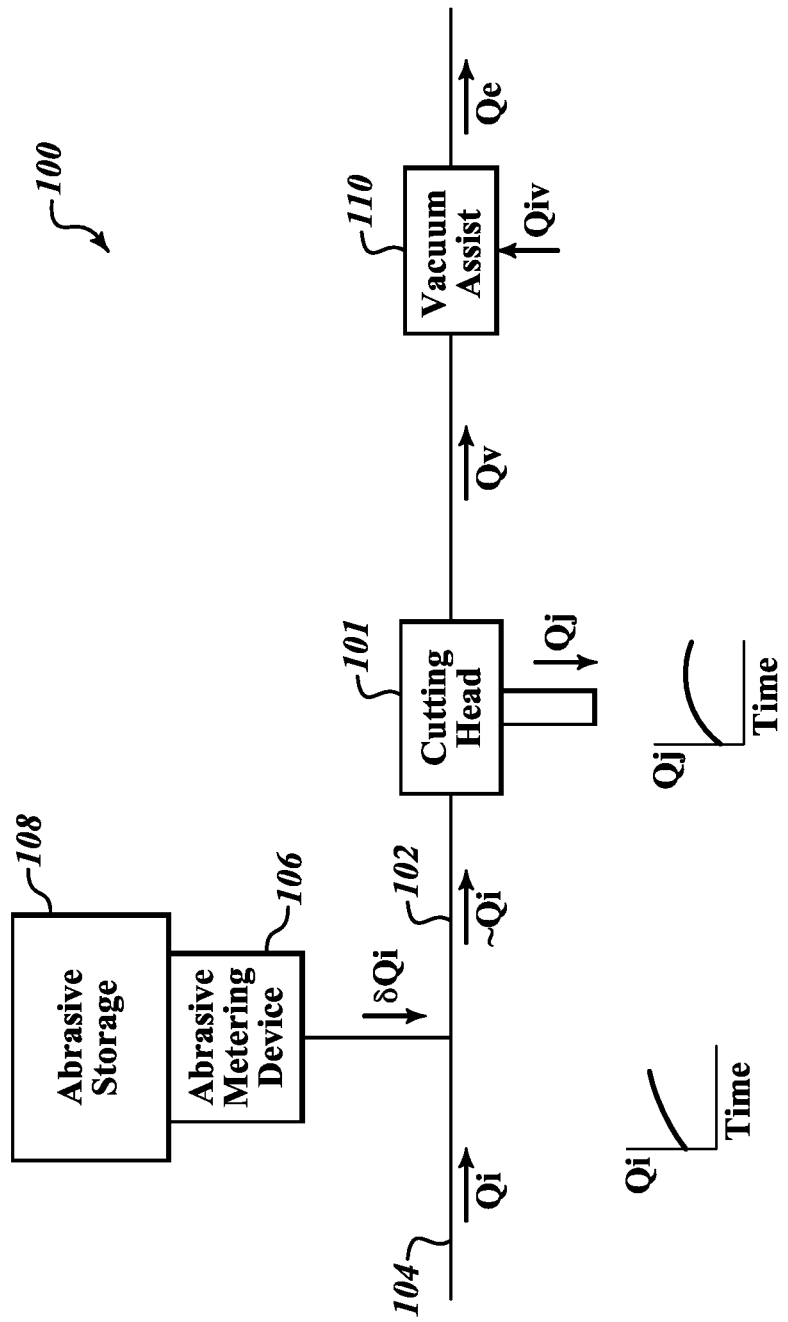
FIG. 4 is a schematic diagram illustrating air flow associated with a conventional abrasive waterjet cutting system.

By way of additional background, FIG. 4 shows a schematic of the air flow associated with a conventional abrasive waterjet cutting system 100. Air flow Qi is drawn into an abrasive feed passageway 102 at a location 104 upstream of a metering valve 106 of an abrasive storage device 108 as a consequence of the high-pressure water moving through a cutting head 101 of the system 100. During operation, the metering valve 106 allows abrasives to fall into the path of the air flow Qi moving through the abrasive feed passageway 102. Some air is also drawn in with the abrasives but the amount is negligible. The fluid jet typically entrains all the air flow Qi unless there is a vacuum assist device 110 running, such as may be the case during piercing operations. When the vacuum assist device 110 is running, some air flow Qv exits the cutting head 101 to the vacuum assist device 110. In either event, the amount of air flow entrained by the fluid jet during operation can vary over time and negatively impact jet performance.

Figure 5:
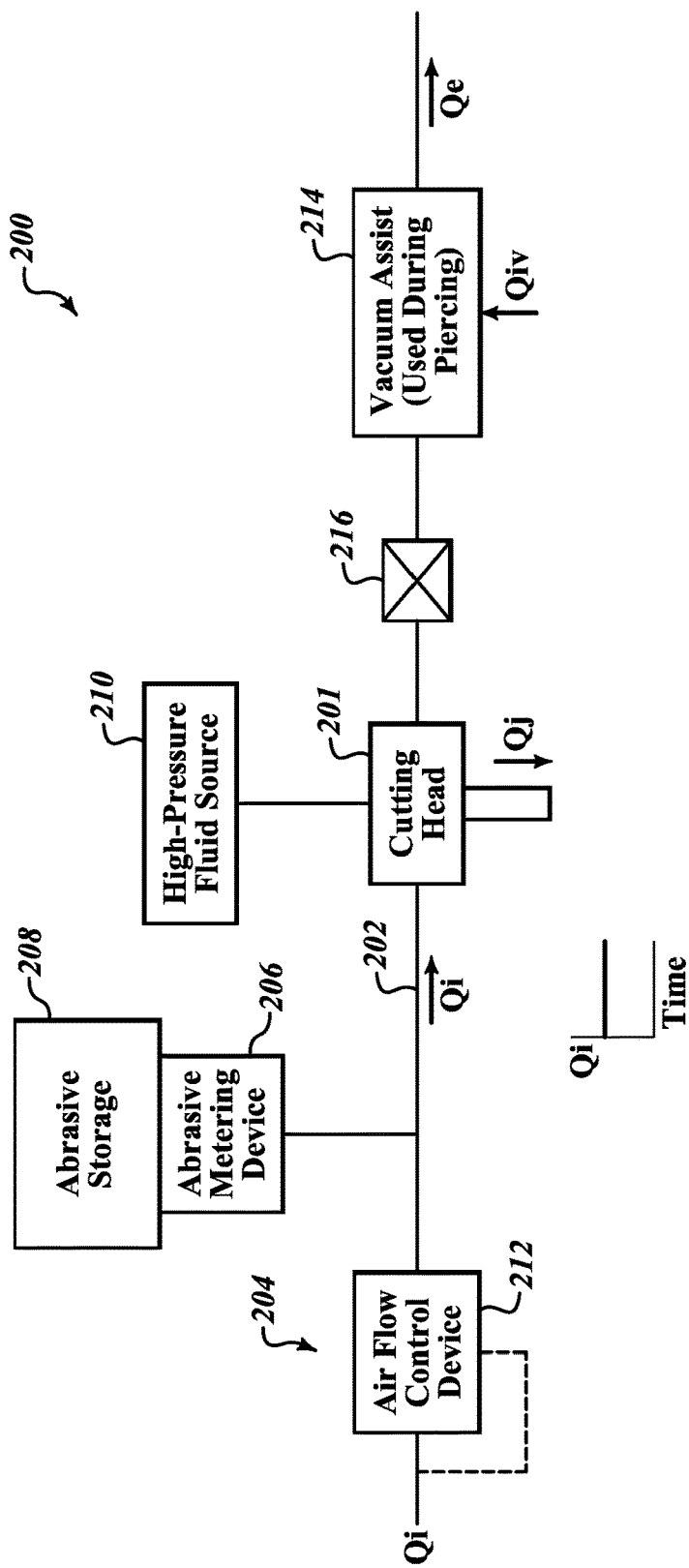
FIG. 5 is a schematic diagram illustrating air flow associated with an example embodiment of an abrasive waterjet cutting system featuring an air flow control device provided in an abrasive feed passageway of the abrasive waterjet cutting system.

With reference to FIG. 5, and in accordance with aspects of the air management systems and methods disclosed herein, one embodiment of an abrasive waterjet cutting system 200 is provided which includes one or more devices to monitor the air flow through an abrasive feed passageway 202 at one or more locations and to subtract, relieve or vent any amount of air flow not desired to enter the cutting head 201. This subtraction can happen at a location 204 upstream of a metering device 206 of an abrasive storage device 208 for feeding abrasives into the abrasive feed passageway 202, as shown in the example embodiment of FIG. 5, or downstream of the metering device 206 but ahead of the cutting head 201. The air flow rate is measured continually or periodically by one or more sensors (not shown), such as mass air flow (MAF) sensors or volumetric air flow sensors, including moving vane sensors or hot wire sensors, and an associated control system is configured to operate an air flow control device 212 (e.g., air flow control valve) based at least in part on said measurements to remove, relieve or vent any excess amount of air flow from the abrasive feed passageway 202 prior to reaching the cutting head 201. The one or more sensors may be positioned at locations along the abrasive feed passageway, or at locations otherwise in fluid communication with the abrasive feed passageway. In this manner, the amount of air flow reaching the cutting head 201 may be maintained at a constant value throughout operation despite wear or other factors that may otherwise cause a change in the air flow rate absent such air flow monitoring and control functionality. In other instances, the amount of air flow may be changed dynamically as desired using feedback control from the air flow measurements that may be taken at one or more locations upstream of the cutting head 201.

As further shown in FIG. 5, a high-pressure water source 210 is coupled to the cutting head 201 to provide high-pressure water to generate the waterjet into which abrasives from the abrasive storage device 208 are introduced via the abrasive feed passageway 202. An optional vacuum assist device 214 may also be provided downstream of the cutting head 201 to assist in drawing abrasives into the cutting head 201 via the abrasive feed passageway 202. A valve 216 may be provided intermediate the vacuum assist device 214 and the cutting head 201 to enable activation and deactivation of vacuum assist functionality. In other instances, the vacuum assist device 214 may be omitted and the cutting head 201 may be plugged, capped or otherwise omit a vacuum assist port that may otherwise be provided for communicating with the vacuum assist device 214 when provided.

Figure 6:
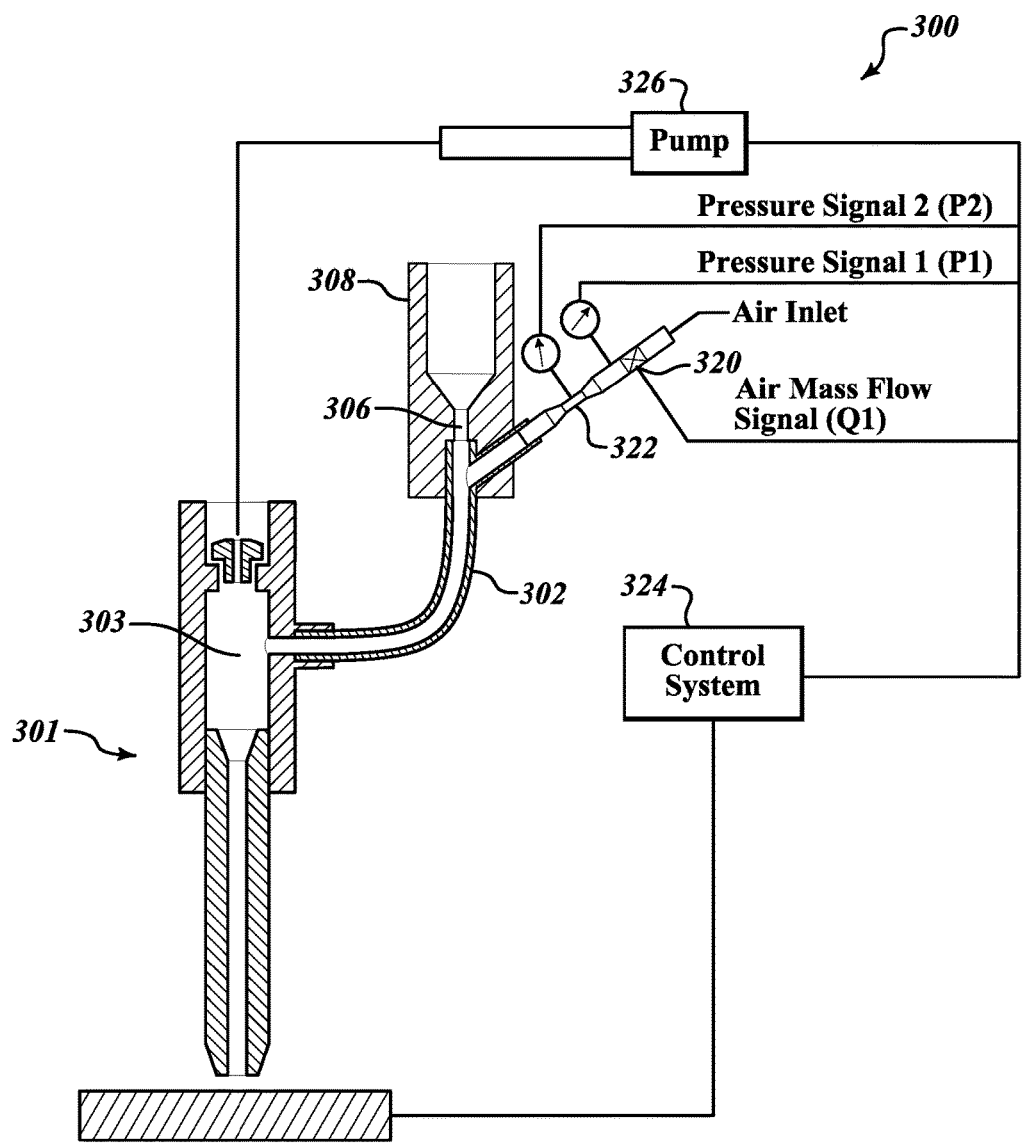
FIG. 6 is a schematic diagram of an example embodiment of an abrasive waterjet cutting system featuring an air flow control device provided in an abrasive feed passageway of the abrasive waterjet cutting system.

FIG. 6 illustrates another example embodiment of an abrasive waterjet cutting system 300 which includes one or more devices to monitor the air flow through an abrasive feed passageway 302 at one or more locations and to subtract any amount of air flow not desired to enter the cutting head 301. The waterjet cutting system 300 includes, among other things, an air flow metering device 320 positioned along the abrasive feed passageway 302 upstream of an abrasive metering device 306 of an abrasive source 308 that discharges abrasive particles into the abrasive feed passageway 302. The air flow metering device 320 is advantageously controlled with a feedback loop to regulate the amount of ambient air that is allowed into the abrasive feed passageway 302 to fluidize the abrasives for transport to a mixing chamber 303 of the cutting head 301. The system may include, for example, a venturi type pressure measuring device 322 positioned along the abrasive feed passageway 302 upstream of the abrasive metering device 306, which provides a differential pressure measurement from which the amount of air flow moving through the abrasive feed passageway 302 toward the cutting head 301 can be calculated. If the value changes, a feedback signal from the pressure drop measuring device 322 may be utilized via a control system 324 to control the air flow metering device 320 to maintain the air flow rate reaching the mixing chamber 303 of the cutting head 301 substantially constant, or at a desired value, throughout at least a portion of a cutting operation. The control system 324 may also control a pump 326 for supplying high-pressure fluid (e.g., water) to the cutting head 301 for generating the abrasive fluid jet. In some instances, the air flow rate may be maintained at a predetermined value ±10%. In other instances, the air flow rate may be maintained at a predetermined value ±5%. Other air flow measuring devices such as, for example, a hot wire anemometer may be used to provide such air flow feedback functionality.

One advantage of the aforementioned system includes the ability to automatically adjust the air flow through the abrasive feed passageway 302 based on different cutting head parameters (e.g., orifice member size, mixing tube size, operating pressure) such that the amount of air that is allowed to enter the mixing chamber 303 is tailored to each configuration of the cutting head 301 and operating pressure of the system 300. For this purpose, a database may be provided, and the control system 324 may be configured to adjust the air flow rate through the abrasive feed passageway 302 based on data obtained from the database which correlates each cutting head configuration and operating pressure with a desired or optimal air flow rate or rates. In some instances, the control system 324 may receive one or more indications of the cutting head parameters from a user of the system, such as, for example, indications provided by a user through a user interface of the control system 324. In other instances, the control system 324 may be configured to automatically determine the cutting head parameters, for example, by sensing the size of the orifice member, the size of the mixing tube and/or the operating pressure. In this manner, the cutting head 301 may be conveniently reconfigured, for example, with a different mixing tube and/or orifice member, and the control system 324 may adjust the air flow through the abrasive feed passageway 302 accordingly to optimize the flow of air entering the mixing chamber 303 for a cutting head configuration having the newly installed components.

Another advantage of the aforementioned system includes the ability to track the velocity of air that is moving through the abrasive feed passageway 302 and entering the mixing chamber 303 as an indicator of the health of the air flow condition. For instance, in maintaining the volumetric air flow substantially constant through the abrasive feed passageway 302, restrictions or blockages in said passageway will result in higher flow velocities which can be assessed by monitoring said flow velocity for such changes.

Another advantage is maintaining a constant volume of air that is allowed to mix with the waterjet so as to provide a consistent jet quality in terms of, for example, coherency and/or composition.

Another advantage is the ability to determine if the cutting head 301 is near to clog or clogged depending on a sudden or dramatic drop in the volumetric flow rate of air that is being drawn into the abrasive feed passageway 302. This can be tied into the control system 324 such that the control system 324 can close the on/off valve that may be used to control the supply of high-pressure fluid to generate the fluid jet and shut the system 300 down until the clog can be assessed and cleared.

Another advantage is that the control system 324 may be configured to carry out a diagnostic check upon startup to determine if the velocity of air moving through the abrasive feed passageway 324 has changed, which may be indicative of changes in cutting set up, such as, for example, changes to the orifice member, the mixing tube, a length of the abrasive feed passageway (e.g., feed hose) between the abrasive source 308 and the cutting head 301, and/or the cross-sectional area of the abrasive feed passageway 302. Subsequent operation can then take into account any such changes in the system.

Another advantage is that the system 300 may be configured to track the change of air velocity throughout the life of the cutting head 301 and recommend changing one or more components of the cutting head (e.g., orifice member, mixing tube), or the cutting head entirely, based on optimized cutting head lifetime equations.

Another advantage is that the air flow through the abrasive feed passageway 302 may be controlled to a particular value or values using feedback control during certain process operations which may benefit from an abrasive waterjet that is not optimized for cutting. For example, in some instances, more air flow may be provided to temporarily diffuse the abrasive fluid jet during piercing or other operations. In some instances, the air flow may be held constant at an elevated value throughout a piercing operation. In other instances, the air flow may vary throughout the piercing operation, and may ramp toward a cutting air flow rate for subsequent cutting after piercing is complete or nearly complete.

Yet another advantage is that for waterjet cutting applications where the orientation of the jet is modified along the cutting path, for taper control, lead angle cutting and/or corner control, the cutting power of the jet can be suitably adjusted using abrasive air mixing control functionality in order to achieve a consistent surface on the waterjet cut workpiece and to optimize cycle time. In this manner, the amount of air flow through the abrasive feed passageway 302 may be changed dynamically based at least in part on one or more parameters of the cutting operation (e.g., cutting speed, lead angle, taper angle).

Additional advantages will be appreciated by those of ordinary skill in the relevant art upon a detailed review of the present disclosure.

Figure 7:
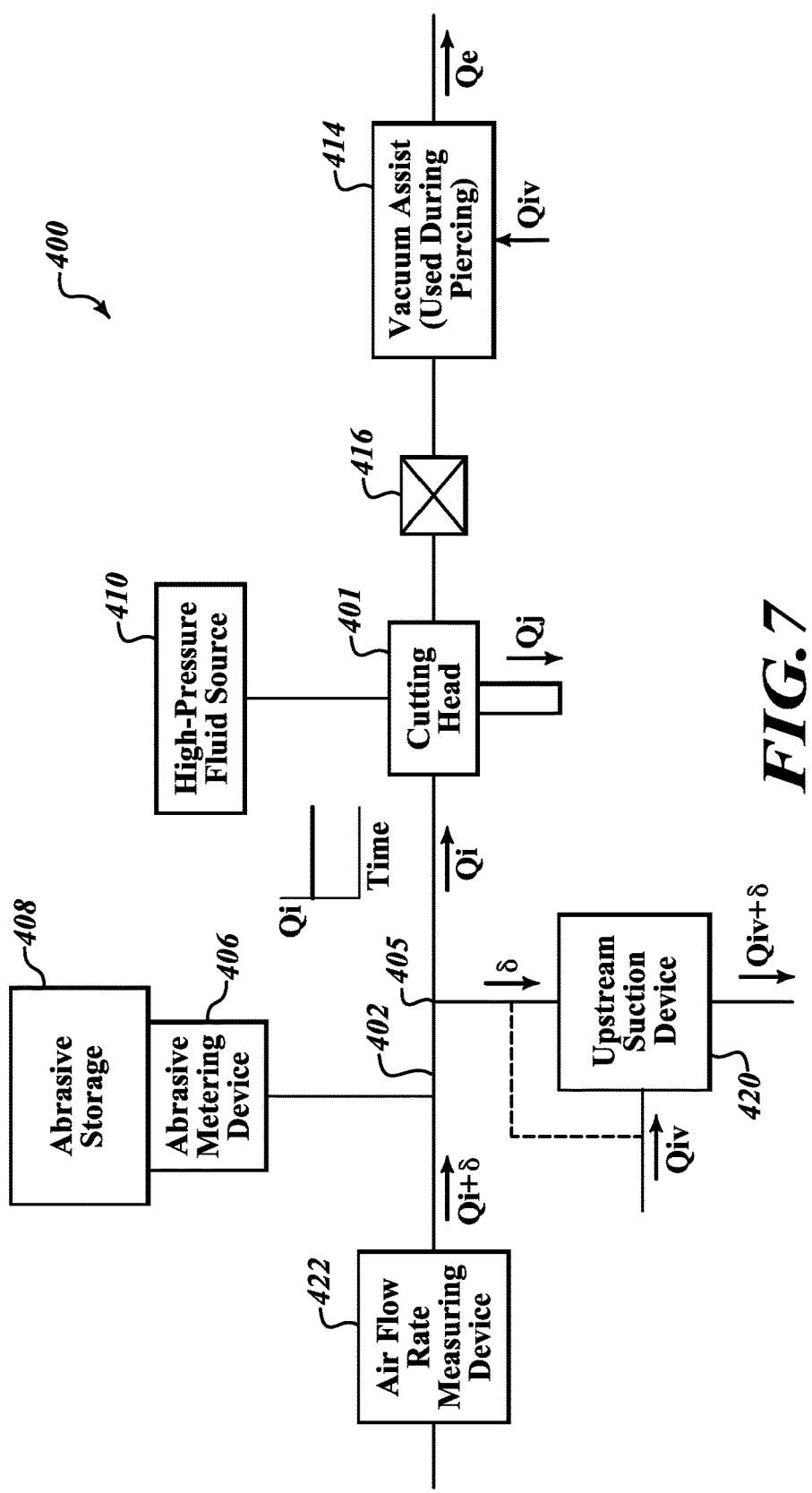
FIG. 7 is a schematic diagram illustrating air flow associated with another example embodiment of an abrasive waterjet cutting system featuring a suction device coupled to an abrasive feed passageway of the abrasive waterjet cutting system upstream of an abrasive waterjet cutting head.

As previously indicated, and with reference to FIG. 7, it may be advantageous in some instances to subtract air flow moving through an abrasive feed passageway 402 before it reaches a cutting head 401 of a waterjet cutting system 400, such as, for example, by subtracting or withdrawing air flow at a location 405 downstream of an abrasive metering device 406 of an abrasive source 408 and upstream of the cutting head 401 such that the amount of air flow entering the cutting head 401 is controlled.

For example, the device for subtracting air flow may be a suction device 420, such as, for example, a vacuum pump, which is in fluid communication with the abrasive feed passageway 402 upstream of the cutting head 401. When provided, the suction device 420 can be used to withdraw a desired amount of air S. An example of a suitable suction device 420 is a vacuum pump provided in the form of a jet pump which uses an air jet to generate suction. In this case, a certain amount of primary air (Qiv) may be supplied to the suction device 420 to withdraw a certain amount of secondary air δ from the abrasive feed passageway 402. This can be regulated such that a desired air flow (Qi) entering the mixing chamber of the cutting head 401 remains constant or substantially constant (e.g., desired value ±10%, or desired value ±5%).

As further shown in FIG. 7, a high-pressure water source 410 is coupled to the cutting head 401 to provide high-pressure water to generate the waterjet into which abrasives from the abrasive storage device 408 are introduced via the abrasive feed passageway 402. An optional vacuum assist device 414 may also be provided downstream of the cutting head 401 to assist in drawing abrasives into the cutting head 401 via the abrasive feed passageway 402. A valve 416 may be provided intermediate the vacuum assist device 414 and the cutting head 201 to enable activation and deactivation of vacuum assist functionality. In other instances, the vacuum assist device 414 may be omitted and the cutting head 401 may be plugged, capped or otherwise omit a vacuum assist port that may otherwise be provided for communicating with the vacuum assist device 414 when provided.

Figures 8A, 8B:
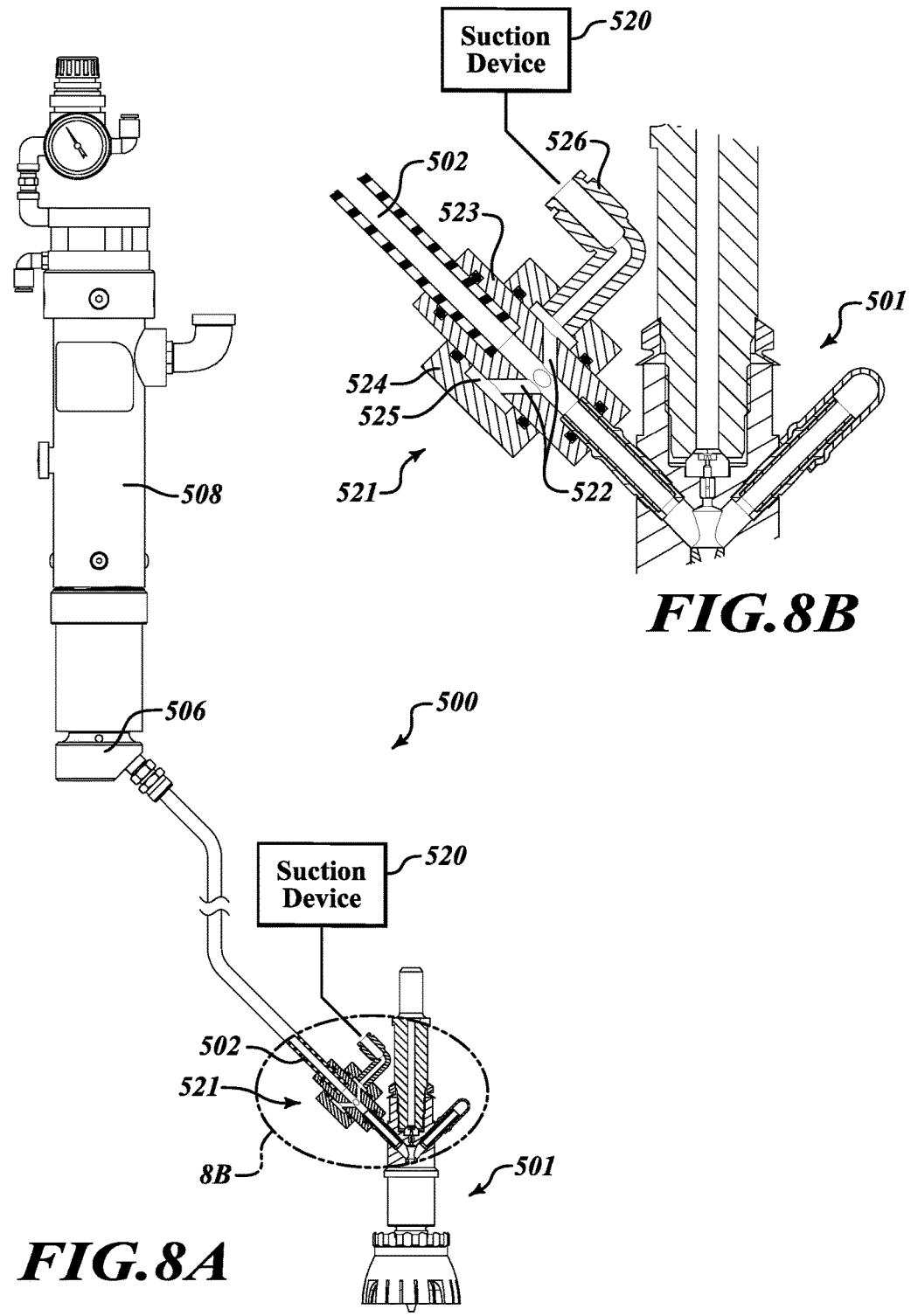
FIG. 8A is an elevational view of an example embodiment of an abrasive waterjet cutting system featuring a suction device coupled to an abrasive feed passageway of the abrasive waterjet cutting system upstream of an abrasive waterjet cutting head.
FIG. 8B is an enlarged cross-sectional detail view of a portion of the abrasive waterjet cutting system of FIG. 8A showing a connection of the suction device to the abrasive feed passageway.

FIGS. 8A and 8B illustrate a system 500 in which a suction device 520 (e.g., a jet pump type vacuum pump) is connected to an abrasive feed passageway 502 upstream of a cutting head 501. In some cases, it may be desired that no air, or substantially no air, enter the cutting head 501, and the illustrated embodiment can provide such functionality. In other instances, it may be desired that the air flow rate through the abrasive feed passageway 502 be merely decreased to a lower level prior to entering the cutting head 501. In each case, a higher air flow rate may be used to carry abrasives toward the cutting head 501, and then air flow may be removed prior to entry into the cutting head 501. The momentum of the abrasives will carry them into the cutting head 501 if the device (e.g., fitting 521 and associated suction device 520) for withdrawing the air flow before the cutting head 501 is designed such that it only removes air from the abrasive feed passageway 502, and not the abrasives. As shown in FIGS. 8A and 8B, this may include a fitting that is arranged to withdraw air from the abrasive feed passageway 502 through one or more passages 522 that are oriented perpendicularly to or at a reverse angle with respect to the direction of flow through the abrasive feed passageway 502.

As can be appreciated from FIG. 8B, the fitting 521 may include a core component 523 having one or more passages 522 for withdrawing air from the abrasive feed passageway 502 and a sleeve component 524 surrounding the core component 523 to define an annular chamber 525 in fluid communication with the one or more passages 522 and a conduit 526 that is coupled to the associated suction device 520. The fitting 521 may be coupled directly to the cutting head 501 or may be positioned at an intermediate location along the abrasive feed passageway 502 between the abrasive metering device 506 and the cutting head 501.

Figure 9:
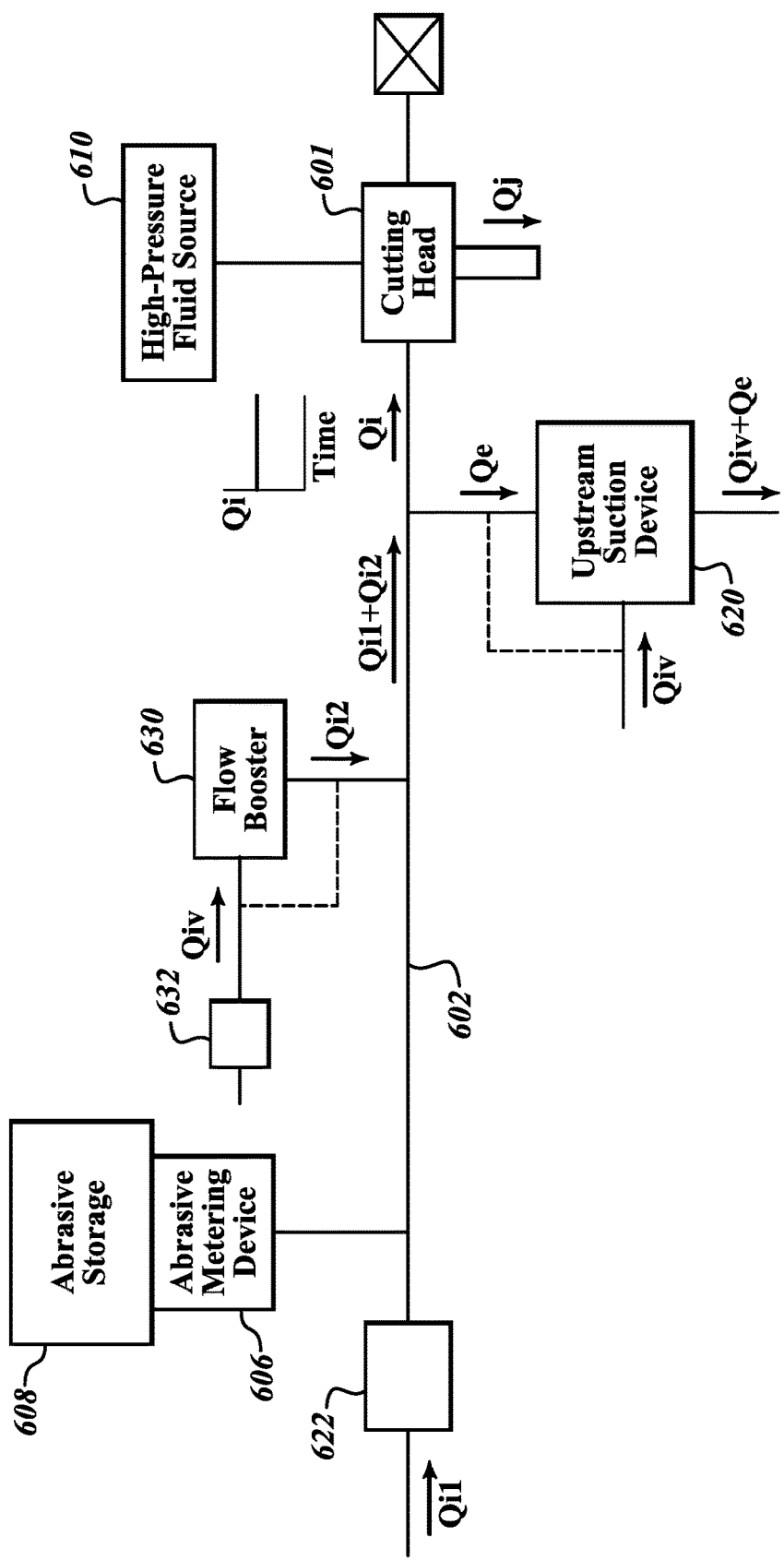
FIG. 9 is a schematic diagram illustrating air flow associated with another example embodiment of an abrasive waterjet cutting system, which includes a flow booster device coupled to an abrasive feed passageway of the abrasive waterjet cutting system.

According to other embodiments, if the air flow rate through an abrasive feed passage is not sufficient to carry the abrasives to the cutting head, as may be the case in relatively long feed lines or when forming smaller diameter jets at lower pressures, positive air feed may be used to supplement the air flow that arises from the jet passing through the cutting head. For example, an inline booster 630 may be used to enhance the air flow rate, as shown in FIG. 9. With reference to FIG. 9, Qi1 is the air flow rate without a booster, and, with a booster 630, the flow rate becomes Qi1+Qi2. The enhanced flow rate must not exceed a certain limit, however, as the velocity of air flow will increase, resulting in faster wear rates in the abrasive feed passageway 602. Accordingly, an optimal amount of boosting may be used based on several factors such as the length of the abrasive feed passageway 602, the cross-sectional area of the abrasive feed passageway 602, and the flow rate of abrasives supplied by an abrasive storage 608 via an abrasive metering device 606.

As shown in FIG. 9, and in accordance with some embodiments, the withdrawal of air flow from the abrasive feed passageway 602 upstream of a cutting head 601, and air flow boosting through the abrasive feed passageway 602, may be used in unison. Thus, in some instances air flow arising from high-pressure water supplied by a high-pressure water source 610 moving through the cutting head 601 may be supplemented with air flow from an air flow booster device 630 (e.g., pressurized air source), and then the air flow moving through the abrasive feed passageway 602 may be reduced prior to entering the cutting head 601 by withdrawing air from the abrasive feed passageway 602 with a suction device 620. To assist in controlling or manipulating the amount of air reaching the cutting head 601, one or more air measurement device 622, 632 may be provided to measure the amount of air flow entering and/or exiting the abrasive feed passageway 602.

Figures 10A, 10B:
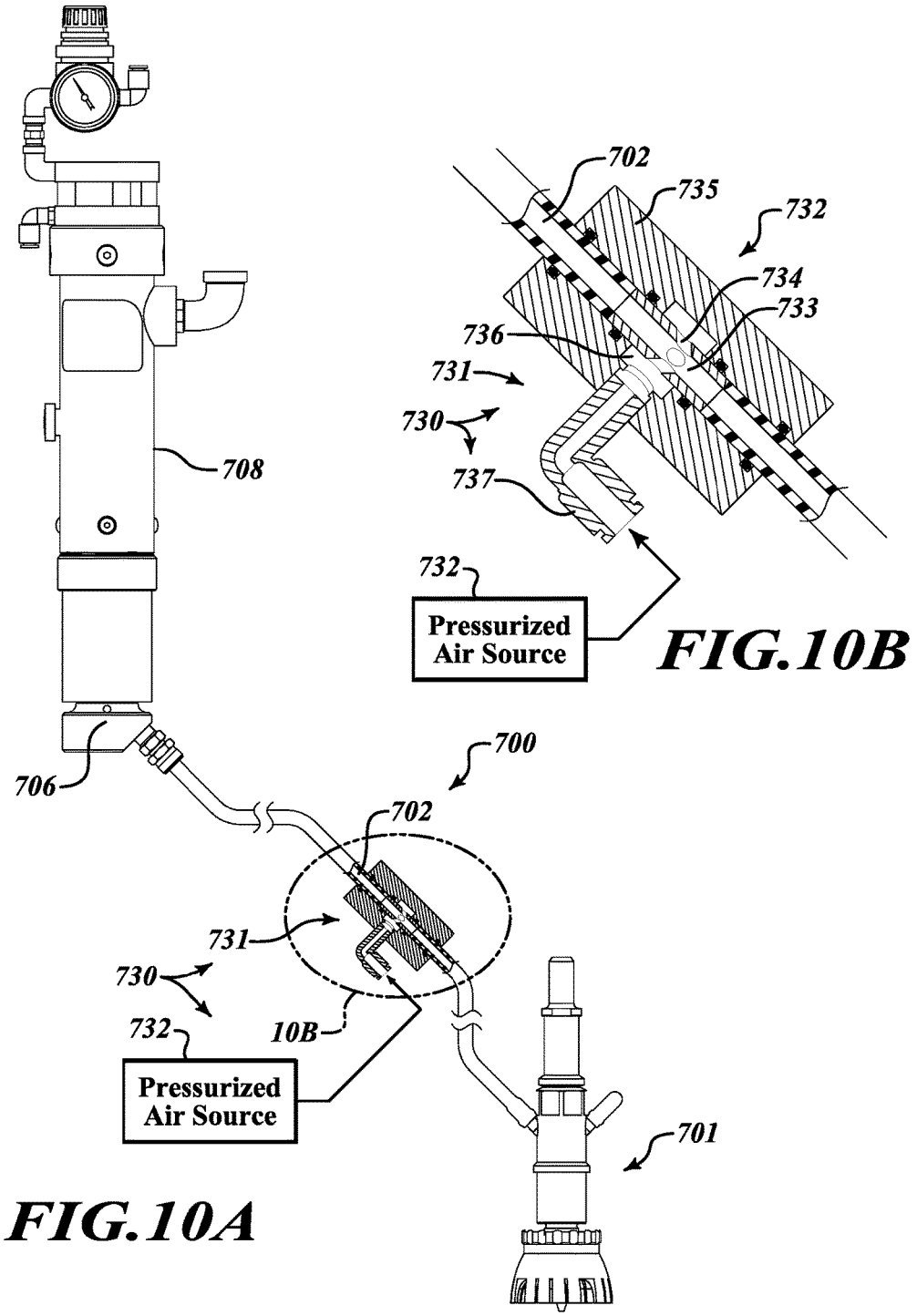
FIG. 10A is an elevational view of an example embodiment of an abrasive waterjet cutting system featuring a flow booster device coupled to an abrasive feed passageway of the abrasive waterjet cutting system.
FIG. 10B is an enlarged cross-sectional detail view of a portion of the abrasive waterjet cutting system of FIG. 10A showing a connection of the flow booster device to the abrasive feed passageway.

With reference to FIGS. 10A and 10B, a flow booster 730 (or "abrasive assist module") may be coupled to an abrasive feed passageway 702 just downstream of an abrasive metering valve 706 of an abrasive source 708 or at an interim location in the abrasive feed passageway 702. The flow booster 730 may include a device, such as a fitting 731, through which both the abrasive and air pass on the way to the cutting head 701. A positive air pressure can be applied to the flow booster 730 by a pressurized air source 732 such that the air column in the abrasive feed passageway 702 and abrasives are accelerated by one or more air jets generated by the flow booster 730. The air jet(s) are preferably oriented with a directional component thereof aligned in the direction of travel (e.g., the air jet(s) are oriented from 0 to 90 degrees relative to the direction of travel of the abrasives through the abrasive feed passageway 702). The flow booster 730 can thus increase the air content in the abrasive feed passageway 702. In some instances, such an increase in the air content could affect jet quality if not removed before reaching the cutting head 701. For example, increased air flow can lead to a disruption of the jet.

Accordingly, in some instances, a suction device (e.g., suction device 520 of FIGS. 8A and 8B) may be coupled to the abrasive feed passageway 702 upstream of the cutting head 701 but downstream of the flow booster 730, and may be used to pull a vacuum on an associated air fitting (e.g., fitting 521 shown in FIGS. 8A and 8B). The orientation of air flow withdrawal passages 522 relative to the direction of abrasive travel is important, as the goal is to control, reduce, or eliminate the air flow passing through the fitting without disrupting the delivery of abrasives to the cutting head 701. Thus, it is important not to collect the abrasives when withdrawing the air flow from the abrasive feed passageway with the suction device 520. In this regard, the system benefits from the fact that the abrasives are far denser than air, and thus travel with higher momentum, if velocity is the same. Tests have shown that if the air flow withdrawal passages 522 are oriented between 90 and 180 degrees from the direction of abrasive travel (see, e.g., FIG. 8B in which air flow withdrawal ports are oriented at 120 degrees from the direction of abrasive travel) that air flow can be withdrawn without collecting a significant amount of abrasives. The fitting 521 associated with the suction device 520, or components thereof, which are in contact with abrasive particles traveling to the cutting head, can be made from a wear-resistant material, such as, for example, carbide, to enhance the life of such components. The fitting 731 associated with the booster device 730, or components thereof, which are in contact with abrasive particles traveling to the cutting head 701, can also be made from a wear-resistant material, such as, for example, carbide.

As can be appreciated from FIG. 10B, the fitting 731 associated with the booster device 730 may include a core component 733 having one or more passages 734 for withdrawing air from the abrasive feed passageway 702, a sleeve component 735 surrounding the core component 733 to define an annular chamber 736 in fluid communication with the one or more passages 734, and a conduit 737 that is coupled to the pressurized air source 732 of the booster device 730.

In connection with embodiments described herein, measurements of air flow into and out of the abrasive feed passageway will be needed if the goal is not to eliminate the flow of air altogether and to instead supply a desired amount of air to the cutting head. Accordingly, air introduced by the flow booster device 730 may be measured with a suitable sensor or device (not shown), and the air withdrawn by the suction device 520 may be measured with a suitable sensor or device (not shown) in order to maintain a known amount of air entering the cutting head 601, which can be controlled to remain constant or substantially constant, or which may be controlled in other manners, using feedback control methodology.

According to some embodiments, one or more air characteristic sensors may also be provided to collect air temperature and/or air moisture content data, as air flow measurements may be affected by the same. The systems described herein may then take into account such air temperature and/or air moisture content data in controlling the flow of air through the abrasive feed passageway.

In accordance with aspects and features of the various systems shown and described with reference to the example embodiments of FIGS. 5 through 10B, various related methods of operating an abrasive fluid jet cutting system may be provided. Such methods may include, for example, continuously or periodically measuring, throughout at least a portion of a processing operation during which an abrasive waterjet is discharged from an abrasive waterjet cutting head, a flow rate of air moving through an abrasive feed passageway at one or more measurement locations, and adjusting the flow rate of air moving through the abrasive feed passageway based at least in part on said measuring.

Adjusting the flow rate of the air moving through the abrasive feed passageway may include adjusting the flow rate such that the flow rate of air input into the abrasive waterjet cutting head that mixes with the high-pressure water and abrasive material of the abrasive waterjet is constant or substantially constant. In some instances, for example, the flow rate may be adjusted such that the flow rate of air input into the abrasive waterjet cutting head that mixes with the high-pressure water and abrasive material of the abrasive waterjet is maintained at a predetermined value ±5%. In other instances, the high-pressure water and abrasive material of the abrasive waterjet may be maintained at a predetermined value ±10%.

Continuously or periodically measuring the flow rate of the air moving through the abrasive feed passageway at the one or more measurement locations may include measuring the flow rate at a location of the abrasive feed passageway upstream of an abrasive material feed location where abrasive material enters the abrasive feed passageway from the abrasive material source, and adjusting the flow rate of air moving through the abrasive feed passageway may include introducing air into the abrasive feed passageway at a flow booster location that is downstream of the abrasive material feed location but upstream of an abrasive material input of the abrasive waterjet cutting head. Adjusting the flow rate of air moving through the abrasive feed passageway may further include, or alternatively include, withdrawing air from the abrasive feed passageway at a flow dump location upstream of the abrasive material input of the abrasive waterjet cutting head. Introducing air into the abrasive feed passageway at the flow booster location may include directing air at positive pressure into the abrasive feed passageway in a direction having a component aligned with the direction of travel of the abrasive material moving through the abrasive feed passageway. In some instances, methods may further include measuring a flow rate of the air introduced into the abrasive feed passageway at the flow booster location, and adjusting the flow rate of the air moving through the abrasive feed passageway based at least in part on said measurements.

In some instances, adjusting the flow rate of the air moving through the abrasive feed passageway may include withdrawing air from the abrasive feed passageway at a flow dump location downstream of an abrasive material feed location where abrasive material enters the abrasive feed passageway from the abrasive material source and upstream of an abrasive material input of the abrasive waterjet cutting head. In addition, withdrawing air from the abrasive feed passageway at the flow dump location may include withdrawing air in a direction having a component aligned opposite the direction of travel of the abrasive material moving through the abrasive feed passageway. The methods may further include measuring a flow rate of the air withdrawn from the abrasive feed passageway via the flow dump location, and adjusting the flow rate of the air moving through the abrasive feed passageway based at least in part on said measurements. The flow dump location may be provided near the abrasive material input of the abrasive waterjet cutting head such that momentum of the abrasive material carried by the air moving through the abrasive feed passageway is sufficient to carry the abrasive material into a mixing chamber of the abrasive waterjet cutting head despite the withdrawing of the air at the flow dump location.

In some instances, adjusting the flow rate of the air moving through the abrasive feed passageway may include adjusting the flow rate during a material piercing operation to be higher than that of a subsequent material cutting operation.

In some instances, the methods may further include determining a desired air flow rate based on one or more operating parameters of the abrasive waterjet cutting system, and adjusting the flow rate of the air moving through the abrasive feed passageway to coincide approximately with the desired air flow rate. The one or more operating parameters may include, for example, an operating pressure; an orifice size of an orifice unit used to generate the abrasive waterjet; and one or more dimensional characteristics of a nozzle or mixing tube through which the abrasive waterjet is discharged from the abrasive waterjet cutting system.

In some instances, the methods may further include obtaining air flow data (air velocity) associated with the flow of air through the abrasive feed passageway, and based at least in part on said air flow data, ascertaining a change in condition of one or more components of the abrasive waterjet cutting system. In such instances, the methods may further include providing one or more indications (e.g., audible or visual alarms) associated with the change in condition of the one or more components of the abrasive waterjet cutting system to a user. In this manner, the system may prompt a user or operator to change a component of the cutting system as it approaches the end of its usable life.

In some instances, the methods may further include monitoring air flow data associated with the flow of air through the abrasive feed passageway to identify a clog event based on a substantial change in the volumetric flow rate of air moving through the abrasive feed passageway. In this manner, the system may temporarily shut the system down and prompt a user or operator to inspect the abrasive feed passageway and clear any clog therein. According to some embodiments, the method may further include initiating a flush sequence in which the abrasive feed passageway is flushed with a fluid to clear obstructions.

In some instances, adjusting the flow rate of the air moving through the abrasive feed passageway may include adjusting the flow rate during one or more material or work surface processing operations to be higher than the volumetric flow rate during a material cutting operation so as to diffuse the jet during said one or more material or work surface processing operations. This may include, for example, diffusing the jet during a material piercing operation by utilizing a relatively higher air flow rate.

In some instances, the methods may further include, during at least the portion of the processing operation, manipulating the abrasive waterjet cutting head in space to change the orientation of the abrasive waterjet discharged from the abrasive waterjet cutting head, and adjusting the volumetric flow rate of the air moving through the abrasive feed passageway may include adjusting the volumetric flow rate based at least in part on the orientation of the abrasive waterjet discharged from the abrasive waterjet cutting head.

In this manner, the coherence or makeup of the jet may be changed dynamically in coordination with the orientation of the cutting head.

In some instances, the methods may further include obtaining air temperature data and/or air moisture content data, and adjusting the flow rate of the air moving through the abrasive feed passageway based at least in part on said air temperature data and/or said air moisture content data. In this manner, air flow through the abrasive feed passageway can be adjusted to account for local temperature and/or humidity conditions. In some embodiments, the methods may also include obtaining air pressure data.

In some instances, the methods may include measuring and controlling the volumetric flow rate of air through the abrasive flow passageway. In other instances, the methods may include measuring and controlling the mass flow rate of air through the abrasive feed passageway.

Other advantageous methodologies associated with operating an abrasive fluid jet cutting system will be readily appreciated by those of ordinary skill in the relevant art upon a detailed review of the present disclosure, including the air management systems disclosed herein.

Although aspects and features of the various embodiments described above are described in the context of abrasive waterjet systems and components, it is appreciated that aspects may be applicable to other high-pressure fluid jet systems. In addition, although aspects and features of the various embodiments described above are described in the context of utilizing air as an abrasive carrier, it is appreciated that abrasive media carriers other than air may be provided and the systems and methods disclosed herein may be modified accordingly. Moreover, aspects and features of the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head, the method comprising:

continuously or periodically measuring, throughout at least a portion of a processing operation during which the abrasive waterjet is discharged from the abrasive waterjet cutting head, a volumetric flow rate of air moving through the abrasive feed passageway at one or more measurement locations; and adjusting the volumetric flow rate of air moving through the abrasive feed passageway based at least in part on said measuring of the volumetric flow rate of the air moving through the abrasive feed passageway at the one or more measurement locations, wherein adjusting the volumetric flow rate of the air moving through the abrasive feed passageway includes introducing air into the abrasive feed passageway at a flow booster location downstream of an abrasive material feed location where the abrasive material enters the abrasive feed passageway from the abrasive material source and upstream of an abrasive material input of the abrasive waterjet cutting head.

2. The method of claim 1 wherein continuously or periodically measuring the volumetric flow rate of air moving through the abrasive feed passageway comprises measuring a standard air flow rate through the abrasive feed passageway at the at one or more measurement locations.

3. The method of claim 1 wherein adjusting the volumetric flow rate of the air moving through the abrasive feed passageway includes adjusting the volumetric flow rate such that the volumetric flow rate of air input into the abrasive waterjet cutting head that mixes with the high-pressure water and the abrasive material of the abrasive waterjet is substantially constant.

4. The method of claim 1 wherein adjusting the volumetric flow rate of the air moving through the abrasive feed passageway includes adjusting the volumetric flow rate such that the volumetric flow rate of air input into the abrasive waterjet cutting head that mixes with the high-pressure water and the abrasive material of the abrasive waterjet is maintained at a predetermined value ±5%.

5. The method of claim 1 wherein continuously or periodically measuring the volumetric flow rate of the air moving through the abrasive feed passageway at the one or more measurement locations includes measuring the volumetric flow rate at a location of the abrasive feed passageway upstream of an abrasive material feed location where the abrasive material enters the abrasive feed passageway from the abrasive material source.

6. The method of claim 1 wherein adjusting the volumetric flow rate of the air moving through the abrasive feed passageway further includes withdrawing air from the abrasive feed passageway at a flow dump location downstream of the flow booster location and upstream of the abrasive material input of the abrasive waterjet cutting head.

7. The method of claim 1 wherein introducing the air into the abrasive feed passageway at the flow booster location includes directing air at positive pressure into the abrasive feed passageway in a direction having a component aligned with the direction of travel of the abrasive material moving through the abrasive feed passageway.

8. The method of claim 1, further comprising:
measuring a volumetric flow rate of the air introduced into the abrasive feed passageway at the flow booster location, and wherein adjusting the volumetric flow rate of the air moving through the abrasive feed passageway is based at least in part on the volumetric flow rate of the air introduced into the abrasive feed passageway at the flow booster location.

9. A method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head, the method comprising:
continuously or periodically measuring, throughout at least a portion of a processing operation during which the abrasive waterjet is discharged from the abrasive waterjet cutting head, a volumetric flow rate of air moving through the abrasive feed passageway at one or more measurement locations; and
adjusting the volumetric flow rate of air moving through the abrasive feed passageway based at least in part on said measuring of the volumetric flow rate of the air moving through the abrasive feed passageway at the one or more measurement locations, wherein adjusting the volumetric flow rate of the air moving through the abrasive feed passageway includes withdrawing air from the abrasive feed passageway at a flow dump location downstream of an abrasive material feed location where the abrasive material enters the abrasive feed passageway from the abrasive material source and upstream of an abrasive material input of the abrasive waterjet cutting head.

10. The method of claim 9 wherein withdrawing the air from the abrasive feed passageway at the flow dump location includes withdrawing air in a direction having a component aligned opposite the direction of travel of the abrasive material moving through the abrasive feed passageway.

11. The method of claim 9, further comprising:
measuring a volumetric flow rate of the air withdrawn from the abrasive feed passageway at the flow dump location, and wherein adjusting the volumetric flow rate of the air moving through the abrasive feed passageway is based at least in part on the volumetric flow rate of the air withdrawn from the abrasive feed passageway at the flow dump location.

12. The method of claim 9 wherein the flow dump location is provided near the abrasive material input of the abrasive waterjet cutting head such that momentum of the abrasive material carried by the air moving through the abrasive feed passageway is sufficient to carry the abrasive material into a mixing chamber of the abrasive waterjet cutting head despite the withdrawing of the air at the flow dump location.

13. The method of claim 1 wherein adjusting the volumetric flow rate of the air moving through the abrasive feed passageway includes adjusting the volumetric flow rate during a material piercing operation to be higher than a subsequent material cutting operation.

14. The method of claim 1, further comprising:
operating a suction device to assist in drawing air through the abrasive feed passageway, the suction device coupled to the abrasive waterjet cutting head at a location apart from the abrasive feed passageway.

15. The method of claim 1, further comprising:
determining a desired air flow rate based on one or more operating parameters of the abrasive waterjet cutting system, and
wherein adjusting the volumetric flow rate of the air moving through the abrasive feed passageway includes adjusting the volumetric flow rate such that the volumetric flow rate of air mixing with the high-pressure water and the abrasive material of the abrasive waterjet coincides approximately with the desired air flow rate.

16. A method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head, the method comprising:
continuously or periodically measuring, throughout at least a portion of a processing operation during which the abrasive waterjet is discharged from the abrasive waterjet cutting head, a volumetric flow rate of air moving through the abrasive feed passageway at one or more measurement locations, adjusting the volumetric flow rate of air moving through the abrasive feed passageway based at least in part on said measuring of the volumetric flow rate of the air moving through the abrasive feed passageway at the one or more measurement locations, and determining a desired air flow rate based on one or more operating parameters of the abrasive waterjet cutting system, wherein adjusting the volumetric flow rate of the air moving through the abrasive feed passageway includes adjusting the volumetric flow rate such that the volumetric flow rate of air mixing with the high-pressure water and the abrasive material of the abrasive waterjet coincides approximately with the desired air flow rate.

17. The method of claim 1, further comprising:

obtaining air flow data associated with the flow of air through the abrasive feed passageway; and based at least in part on said air flow data, ascertaining a change in condition of one or more components of the abrasive waterjet cutting system.

18. The method of claim 17, further comprising:

providing one or more indications associated with the change in condition of the one or more components of the abrasive waterjet cutting system to a user.

19. The method of claim 1, further comprising:

monitoring air flow data associated with the flow of air through the abrasive feed passageway to identify a clog event based on a substantial change in the volumetric flow rate of the air moving through the abrasive feed passageway.

20. A method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head, the method comprising:

continuously or periodically measuring, throughout at least a portion of a processing operation during which the abrasive waterjet is discharged from the abrasive waterjet cutting head, a volumetric flow rate of air moving through the abrasive feed passageway at one or more measurement locations; and adjusting the volumetric flow rate of air moving through the abrasive feed passageway based at least in part on said measuring of the volumetric flow rate of the air moving through the abrasive feed passageway at the one or more measurement locations, wherein adjusting the volumetric flow rate of the air moving through the abrasive feed passageway includes adjusting the volumetric flow rate during one or more material or work surface processing operations to be higher than the volumetric flow rate during a material cutting operation so as to diffuse the abrasive waterjet during said one or more material or work surface processing operations.

21. A method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head, the method comprising:

continuously or periodically measuring, throughout at least a portion of a processing operation during which the abrasive waterjet is discharged from the abrasive waterjet cutting head, a volumetric flow rate of air moving through the abrasive feed passageway at one or more measurement locations;

during the at least a portion of the processing operation, manipulating the abrasive waterjet cutting head in space to change an orientation of the abrasive waterjet discharged from the abrasive waterjet cutting head; and adjusting the volumetric flow rate of air moving through the abrasive feed passageway based at least in part on said measuring of the volumetric flow rate of the air moving through the abrasive feed passageway at the one or more measurement locations, wherein adjusting the volumetric flow rate of the air moving through the abrasive feed passageway includes adjusting the volumetric flow rate based at least in part on the orientation of the abrasive waterjet discharged from the abrasive waterjet cutting head.

22. A method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head, the method comprising:

continuously or periodically measuring, throughout at least a portion of a processing operation during which the abrasive waterjet is discharged from the abrasive waterjet cutting head, a volumetric flow rate of air moving through the abrasive feed passageway at one or more measurement locations;

adjusting the volumetric flow rate of air moving through the abrasive feed passageway based at least in part on said measuring of the volumetric flow rate of the air moving through the abrasive feed passageway at the one or more measurement locations; and obtaining air temperature data and/or air moisture content data, wherein adjusting the volumetric flow rate of the air moving through the abrasive feed passageway is based at least in part on said air temperature data and/or said air moisture content data.

23. A method of operating an abrasive fluid jet cutting system having a high-pressure fluid source, an abrasive material source, an abrasive fluid jet cutting head configured to generate an abrasive fluid jet from high-pressure fluid supplied by the high-pressure fluid source and abrasive material supplied by the abrasive material source, and an abrasive feed passageway through which the abrasive material from the abrasive material source flows to the abrasive fluid jet cutting head, the method comprising:

continuously or periodically measuring, throughout at least a portion of a processing operation during which the abrasive fluid jet is discharged from the abrasive fluid jet cutting head, a volumetric flow rate of an abrasive material carrier fluid moving through the abrasive feed passageway at one or more measurement locations; and adjusting the volumetric flow rate of the abrasive material carrier fluid moving through the abrasive feed passageway based at least in part on said measuring of the volumetric flow rate of the abrasive material carrier fluid moving through the abrasive feed passageway at the one or more measurement locations, wherein adjusting the volumetric flow rate of the abrasive material carrier moving through the abrasive feed passageway includes adjusting the volumetric flow rate during a material piercing operation to be higher than a subsequent material cutting operation.

24. An abrasive waterjet cutting system, comprising:
a high-pressure water source;
an abrasive material source;
an abrasive waterjet cutting head configured to generate an abrasive waterjet from high-pressure water supplied by the high-pressure water source and abrasive material supplied by the abrasive material source, the abrasive waterjet cutting head including a mixing chamber and an abrasive material input through which the abrasive material is supplied to the mixing chamber of the abrasive waterjet cutting head;
an abrasive feed passageway in fluid communication with the abrasive material input of the abrasive waterjet cutting head, the abrasive feed passageway including an abrasive material feed location through which the abrasive material from the abrasive material source is fed into the abrasive feed passageway for supply to the abrasive waterjet cutting head;
an air flow sensor positioned to measure a volumetric flow rate of air moving through the abrasive feed passageway at a measurement location;
an air flow control device configured to control the flow of air moving through the abrasive feed passageway;
a control system communicatively coupled to the air flow sensor and the air flow control device, the control system being configured to continuously or periodically measure, throughout at least a portion of a processing operation during which the abrasive waterjet is discharged from the abrasive waterjet cutting head, the volumetric flow rate of air moving through the abrasive feed passageway at the measurement location via the air flow sensor, and to adjust the volumetric flow rate of air moving through the abrasive feed passageway via the air flow control device based at least in part on said measurement of the volumetric flow rate of the air moving through the abrasive feed passageway at the measurement location; and
an air flow booster device coupled to the abrasive feed passageway at an air flow booster location downstream of the abrasive material feed location and upstream of the abrasive material input of the abrasive waterjet cutting head.

25. The abrasive waterjet cutting system of claim 24 wherein the measurement location is upstream of the abrasive material feed location.

26. The abrasive waterjet cutting system of claim 24, further comprising:
an air flow suction device coupled to the abrasive feed passageway at a flow dump location downstream of the air flow booster location and upstream of the abrasive material input of the abrasive waterjet cutting head.

27. The abrasive waterjet cutting system of claim 24 wherein the air flow booster device is coupled to the abrasive feed passageway to direct air into the abrasive feed passageway in a direction having a component aligned with a direction of travel of the abrasive material moving through the abrasive feed passageway.

28. The abrasive waterjet cutting system of claim 24, further comprising:
a supplemental air flow sensor positioned to measure a volumetric flow rate of air introduced into the abrasive feed passageway by the air flow booster device at the air flow booster location.

29. An abrasive waterjet cutting system comprising:
a high-pressure water source;
an abrasive material source;
an abrasive waterjet cutting head configured to generate an abrasive waterjet from high-pressure water supplied by the high-pressure water source and abrasive material supplied by the abrasive material source, the abrasive waterjet cutting head including a mixing chamber and an abrasive material input through which the abrasive material is supplied to the mixing chamber of the abrasive waterjet cutting head;
an abrasive feed passageway in fluid communication with the abrasive material input of the abrasive waterjet cutting head, the abrasive feed passageway including an abrasive material feed location through which the abrasive material from the abrasive material source is fed into the abrasive feed passageway for supply to the abrasive waterjet cutting head;
an air flow sensor positioned to measure a volumetric flow rate of air moving through the abrasive feed passageway at a measurement location;
an air flow control device configured to control the flow of air moving through the abrasive feed passageway;
a control system communicatively coupled to the air flow sensor and the air flow control device, the control system being configured to continuously or periodically measure, throughout at least a portion of a processing operation during which the abrasive waterjet is discharged from the abrasive waterjet cutting head, the volumetric flow rate of air moving through the abrasive feed passageway at the measurement location via the air flow sensor, and to adjust the volumetric flow rate of air moving through the abrasive feed passageway via the air flow control device based at least in part on said measurement of the volumetric flow rate of the air moving through the abrasive feed passageway at the measurement location; and
an air flow suction device coupled to the abrasive feed passageway at a flow dump location downstream of the abrasive material feed location and upstream of the abrasive material input of the abrasive waterjet cutting head.

30. The abrasive waterjet cutting system of claim 29 wherein the air flow suction device is coupled to the abrasive feed passageway to withdraw air in a direction having a component aligned opposite a direction of travel of the abrasive material moving through the abrasive feed passageway.

31. The abrasive waterjet cutting system of claim 29, further comprising:
a supplemental air flow sensor positioned to measure a volumetric flow rate of the air withdrawn from the abrasive feed passageway by the air flow suction device at the flow dump location.

32. The abrasive waterjet cutting system of claim 29 wherein the flow dump location is provided near the abrasive material input of the abrasive waterjet cutting head such that momentum of the abrasive material carried by the air moving through the abrasive feed passageway is sufficient to carry the abrasive material into the mixing chamber of the abrasive waterjet cutting head despite the withdrawal of air by the air flow suction device at the flow dump location.

33. An abrasive waterjet cutting system comprising:
a high-pressure water source;
an abrasive material source;
an abrasive waterjet cutting head configured to generate an abrasive waterjet from high-pressure water supplied by the high-pressure water source and abrasive material supplied by the abrasive material source, the abrasive waterjet cutting head including a mixing chamber and an abrasive material input through which the abrasive material is supplied to the mixing chamber of the abrasive waterjet cutting head;
an abrasive feed passageway in fluid communication with the abrasive material input of the abrasive waterjet cutting head, the abrasive feed passageway including an abrasive material feed location through which the abrasive material from the abrasive material source is fed into the abrasive feed passageway for supply to the abrasive waterjet cutting head;
an air flow sensor positioned to measure a volumetric flow rate of air moving through the abrasive feed passageway at a measurement location;
an air flow control device configured to control the flow of air moving through the abrasive feed passageway;
a control system communicatively coupled to the air flow sensor and the air flow control device, the control system being configured to continuously or periodically measure, throughout at least a portion of a processing operation during which the abrasive waterjet is discharged from the abrasive waterjet cutting head, the volumetric flow rate of air moving through the abrasive feed passageway at the measurement location via the air flow sensor, and to adjust the volumetric flow rate of air moving through the abrasive feed passageway via the air flow control device based at least in part on said measurement of the volumetric flow rate of the air moving through the abrasive feed passageway at the measurement location; and
a suction device to assist in drawing air through the abrasive feed passageway, the suction device coupled to the abrasive waterjet cutting head at a location apart from the abrasive feed passageway.

34. An abrasive waterjet cutting system comprising:
a high-pressure water source;
an abrasive material source;
an abrasive waterjet cutting head configured to generate an abrasive waterjet from high-pressure water supplied by the high-pressure water source and abrasive material supplied by the abrasive material source, the abrasive waterjet cutting head including a mixing chamber and an abrasive material input through which the abrasive material is supplied to the mixing chamber of the abrasive waterjet cutting head;
an abrasive feed passageway in fluid communication with the abrasive material input of the abrasive waterjet cutting head, the abrasive feed passageway including an abrasive material feed location through which the abrasive material from the abrasive material source is fed into the abrasive feed passageway for supply to the abrasive waterjet cutting head;
an air flow sensor positioned to measure a volumetric flow rate of air moving through the abrasive feed passageway at a measurement location;
an air flow control device configured to control the flow of air moving through the abrasive feed passageway;
a control system communicatively coupled to the air flow sensor and the air flow control device, the control system being configured to continuously or periodically measure, throughout at least a portion of a processing operation during which the abrasive waterjet is discharged from the abrasive waterjet cutting head, the volumetric flow rate of air moving through the abrasive feed passageway at the measurement location via the air flow sensor, and to adjust the volumetric flow rate of air moving through the abrasive feed passageway via the air flow control device based at least in part on said measurement of the volumetric flow rate of the air moving through the abrasive feed passageway at the measurement location; and
one or more sensors configured to obtain air temperature and/or air moisture content data from which to adjust the flow of air through the abrasive feed passageway.

35. A method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head, the method comprising:
continuously or periodically measuring, throughout at least a portion of a processing operation during which the abrasive waterjet is discharged from the abrasive waterjet cutting head, a volumetric flow rate of air moving through the abrasive feed passageway at one or more measurement locations to generate air flow data associated with the flow of air through the abrasive feed passageway;
based at least in part on said air flow data, ascertaining a change in an operational condition of the abrasive waterjet cutting system, wherein ascertaining the change in the operational condition of the abrasive waterjet cutting system includes identifying an abrasive material clog event based on a substantial charge in the volumetric flow rate of the air moving through the abrasive feed passageway; and
initiating a flush sequence in which the abrasive feed passageway is flushed with a fluid to clear obstructions.

36. The method of claim 35, further comprising:
providing one or more indications associated with the change in operational condition of the abrasive waterjet cutting system to a user, and/or shutting down the abrasive waterjet cutting system in response to the change in operational condition.

37. The method of claim 35 wherein continuously or periodically measuring the volumetric flow rate of the air moving through the abrasive feed passageway at the one or more measurement locations includes measuring the volumetric flow rate at a location of the abrasive feed passageway upstream of an abrasive material feed location where the abrasive material enters the abrasive feed passageway from the abrasive material source.

38. An abrasive waterjet cutting system, comprising:
a high-pressure water source;
an abrasive material source;
an abrasive waterjet cutting head configured to generate an abrasive waterjet from high-pressure water supplied by the high-pressure water source and abrasive material supplied by the abrasive material source, the abrasive waterjet cutting head including a mixing chamber and an abrasive material input through which the abrasive material is supplied to the mixing chamber of the abrasive waterjet cutting head;

an abrasive feed passageway in fluid communication with the abrasive material input of the abrasive waterjet cutting head, the abrasive feed passageway including an abrasive material feed location through which the abrasive material from the abrasive material source is fed into the abrasive feed passageway for supply to the abrasive waterjet cutting head;

an air flow sensor positioned to measure a volumetric flow rate of air moving through the abrasive feed passageway at a measurement location; and a control system communicatively coupled to the air flow sensor, the control system being configured to continuously or periodically measure, throughout at least a portion of a processing operation during which the abrasive waterjet is discharged from the abrasive waterjet cutting head, the volumetric flow rate of air moving through the abrasive feed passageway at the measurement location via the air flow sensor to generate air flow data, and to ascertain a change in condition of one or more components of the abrasive waterjet cutting system and/or a change in an operational condition of the abrasive waterjet cutting system based at least in part on said air flow data; and an air flow booster device coupled to the abrasive feed passageway at an air flow booster location downstream of the abrasive material feed location and upstream of the abrasive material input of the abrasive waterjet cutting head.

39. The system of claim 38 wherein the control system is further configured to provide one or more indications associated with the change in the condition of the one or more components of the abrasive waterjet cutting system and/or the change in the operational condition of the abrasive waterjet cutting system to a user, and/or to shut down the abrasive waterjet cutting system in response to the change in the condition of the one or more components and/or the change in the operational condition.

40. The system of claim 38 wherein the control system is configured to identify an excessive wear condition of at least one of the following components based at least in part on the air flow data:
  a mixing tube through which the abrasive waterjet is discharged;
  an orifice member through which the high-pressure water passes to generate a high-pressure waterjet to be mixed with the abrasive material; and
  a delivery conduit which at least partially defines the abrasive feed passageway.

41. The system of claim 38 wherein the control system is configured to identify an abrasive material clog event based on a substantial change in the volumetric flow rate of the air moving through the abrasive feed passageway.

42. The system of claim 38 wherein the measurement location is upstream of an abrasive material feed location where the abrasive material enters the abrasive feed passageway from the abrasive material source.

43. A method of operating an abrasive waterjet cutting system having a high-pressure water source, an abrasive material source, an abrasive waterjet cutting head configured to generate an abrasive waterjet from high-pressure water supplied by the high-pressure water source and abrasive material supplied by the abrasive material source, and an abrasive feed passageway through which the abrasive material from the abrasive material source flows to the abrasive waterjet cutting head, the method comprising:
  continuously or periodically measuring, throughout at least a portion of a processing operation during which the abrasive waterjet is discharged from the abrasive waterjet cutting head, a volumetric flow rate of air moving through the abrasive feed passageway at one or more measurement locations,
  adjusting the volumetric flow rate of air moving through the abrasive feed passageway based at least in part on said measuring of the volumetric flow rate of the air moving through the abrasive feed passageway at the one or more measurement locations, and
  operating a suction device to assist in drawing air through the abrasive feed passageway, the suction device coupled to the abrasive waterjet cutting head at a location apart from the abrasive feed passageway.

44. The method of claim 16 wherein the operating parameters of the abrasive waterjet cutting system include at least one of the following:
  an operating pressure;
  an orifice size of an orifice unit used to generate the abrasive waterjet; and
  one or more dimensional characteristics of a nozzle or mixing tube through which the abrasive waterjet is discharged from the abrasive waterjet cutting system.

* * * * *